US012596105B2

(12) United States Patent
Horikawa et al.

(10) Patent No.: US 12,596,105 B2
(45) Date of Patent: Apr. 7, 2026

(54) DEFECT INSPECTION APPARATUS AND DEFECT INSPECTION METHOD

(71) Applicant: SHIMADZU CORPORATION, Kyoto (JP)

(72) Inventors: Hiroshi Horikawa, Kyoto (JP); Kenji Takubo, Kyoto (JP); Takahide Hatahori, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 376 days.

(21) Appl. No.: 18/290,270

(22) PCT Filed: Mar. 25, 2022

(86) PCT No.: PCT/JP2022/014263
§ 371 (c)(1),
(2) Date: Nov. 10, 2023

(87) PCT Pub. No.: WO2022/239522
PCT Pub. Date: Nov. 17, 2022

(65) Prior Publication Data
US 2024/0230601 A1 Jul. 11, 2024

(30) Foreign Application Priority Data

May 14, 2021 (JP) ................................. 2021-082490

(51) Int. Cl.
*G01N 29/24* (2006.01)
*G01N 29/04* (2006.01)
*G01N 29/32* (2006.01)

(52) U.S. Cl.
CPC ....... *G01N 29/2418* (2013.01); *G01N 29/041* (2013.01); *G01N 29/32* (2013.01); *G01N 2291/0289* (2013.01)

(58) Field of Classification Search
CPC ......... G01N 21/892; G01N 2291/0289; G01N 29/041; G01N 29/24; G01N 29/2418; G01N 29/32
See application file for complete search history.

(56) References Cited

U.S. PATENT DOCUMENTS

2017/0350690 A1* 12/2017 Hatahori ............. G01M 5/0091
2022/0026396 A1* 1/2022 Hatahori ................ G01N 21/88

FOREIGN PATENT DOCUMENTS

JP 2017-219318 A 12/2017

OTHER PUBLICATIONS

International Search Report for corresponding Application No. PCT/JP2022/014263, mailed Jun. 14, 2022.
(Continued)

*Primary Examiner* — Kristina M Deherrera
*Assistant Examiner* — Gedeon M Kidanu
(74) *Attorney, Agent, or Firm* — Renner, Otto, Boisselle & Sklar, LLP

(57) ABSTRACT

A defect inspection apparatus (100) according to the present invention includes an exciter (1), an irradiator (laser illuminator 2) configured to irradiate an inspection target (8) with laser light, and a measurer (3) configured to change a phase of the laser light reflected by the inspection target (8) to cause the laser light having an unchanged phase to interfere with the laser light having a changed phase, and to measure the interference light. The measurer (3) is configured to acquire an interference image (71) representing a vibration state of the inspection target (8) as viewed in a direction extending along a first light path (21), and an interference image (72) representing a vibration state of the inspection target (8) as viewed in a direction extending along a second
(Continued)

[FIRST EMBODIMENT]

light path (22) in which the reflected laser light travels from the inspection target (8) in a direction different from the first light path (21).

14 Claims, 22 Drawing Sheets

(56)                    References Cited

OTHER PUBLICATIONS

Written Opinion for corresponding Application No. PCT/JP2022/014263, mailed Jun. 14, 2022, with English translation.

\* cited by examiner

[FIRST EMBODIMENT]

[FIRST EMBODIMENT]

[FIRST EMBODIMENT]

[SECOND EMBODIMENT]

[SECOND EMBODIMENT]

[THIRD EMBODIMENT]

[THIRD EMBODIMENT]

[THIRD EMBODIMENT]

[FOURTH EMBODIMENT]

[FIFTH EMBODIMENT]

[FIFTH EMBODIMENT]

[FIRST MODIFIED EMBODIMENT]

DEFECT INSPECTION APPARATUS AND DEFECT INSPECTION METHOD

TECHNICAL FIELD

The present invention relates to a defect inspection apparatus and a defect inspection method.

BACKGROUND ART

A defect inspection apparatus and a defect inspection method for optically inspecting defects such as cracks and peelings on a surface of an inspection target and inside the inspection target is known in the art. Such a defect inspection apparatus and a defect inspection method are disclosed in Japanese Patent Laid-Open Publication No. JP 2017-219318, for example.

The above Japanese Patent Laid-Open Publication No. JP 2017-219318 discloses a defect detection apparatus including a generation unit configured to generate an elastic wave in a target object, a light source configured to perform stroboscopic illumination onto a measurement area of a surface of the target object, and an interferometer (speckle shearing interferometer). The interferometer is configured to collectively measure displacements s in a direction orthogonal to the surface of the target object at each point in the measurement area with respect to at mutually-different phases of the elastic wave by controlling a phase of the elastic wave and a timing of the stroboscopic illumination. In the defect detection apparatus disclosed in the above Japanese Patent Laid-Open Publication No. JP 2017-219318, represents differences of displacements of the target object to be vibrated in the direction orthogonal to its surface is generated by light and dark differences based on vibration states (amplitudes and phases) at points in the measurement area. For example, if the target object includes a defect, a change of vibration states will be discontinuous at the defect part (vibration states will change at an edge of the defect) so that the light and dark pattern of the aforementioned image will sharply change. Such a discontinuous part of the vibration states can be detected by visually checking or applying image processing to this image.

PRIOR ART

Patent Document

Patent Document 1: Japanese Patent Laid-Open Publication No. JP 2017-219318

SUMMARY OF THE INVENTION

Problems to be Solved by the Invention

Although not clearly stated in the above Japanese Patent Laid-Open Publication No. JP 2017-219318, propagation of vibration includes components in the direction orthogonal to the surface of the inspection target (upward/downward direction) and in a direction extending along the surface (surface direction). If the target object includes a relatively deep crack, large discontinuity (displacement) of the vibration states appears both in the direction orthogonal to the surface of the inspection target (upward/downward direction) and in the direction extending along the surface of the inspection target (surface direction). Contrary to this, if the target object includes a relatively shallow crack, discontinuity (displacement) of the vibration states in the direction orthogonal to the surface of the inspection target (upward/downward direction) is small. In known defect inspection apparatuses such as the defect detection apparatus disclosed in the above Japanese Patent Laid-Open Publication No. JP 2017-219318, because it is determined whether any defect is included in an inspection target based on discontinuity (displacement) of the vibration states of the inspection target that are obtained in the direction orthogonal to the surface of the inspection target (upward/downward direction), it is possible to determine whether a relatively deep crack is included in the inspection target. On the other hand, the known defect inspection apparatuses such as the defect detection apparatus disclosed in the above Japanese Patent Laid-Open Publication No. JP 2017-219318 cannot easily determine whether a relatively shallow crack, which produces small discontinuity (displacement) of the vibration states in the direction orthogonal to the surface of the inspection target (upward/downward direction), is included in the inspection target. Also, although not clearly stated in the above Japanese Patent Laid-Open Publication No. JP 2017-219318, a direction of discontinuity (displacement) of the vibration states that is obtained (observed) by the known defect inspection apparatuses such as the defect detection apparatus disclosed in the above Japanese Patent Laid-Open Publication No. JP 2017-219318 is a direction that bisects an angle formed by the light source and the interferometer with respect to the inspection target.

For this reason, in the known defect inspection apparatuses such as the defect detection apparatus disclosed in the above Japanese Patent Laid-Open Publication No. JP 2017-219318, in order to determine whether a relatively shallow crack is included in the inspection target, the direction (interference image obtaining direction) of discontinuity (displacement) of the vibration states to be obtained (observed) is necessarily changed by changing the angle of the inspection target with respect to the interferometer, etc. In other words, an angle of an inspection target with respect to a measurer is required to change depending on a depth of its crack. Consequently, it is desired to easily determine whether any crack having any depth (relatively deep crack, relatively shallow crack, etc.) is included in an inspection target without changing an angle of the inspection target with respect to a measurer.

The present invention is intended to solve the above problems, and one object of the present invention is to provide a defect inspection apparatus and a defect inspection method capable of easily determining whether any crack having any depth is included in an inspection target without changing an angle of the inspection target with respect to a measurer.

A defect inspection apparatus according to a first aspect of the present invention includes an exciter configured to impart elastic wave vibration to an inspection target to excite the elastic wave vibration in the inspection target; an irradiator configured to irradiate the inspection target in an excited state in which the elastic wave vibration is excited by the exciter with laser light; and a measurer configured to change a phase of the laser light reflected by the inspection target to cause the laser light having an unchanged phase to interfere with the laser light having a changed phase, and to measure interference light, wherein the measurer is configured to acquire, based on interference light of the laser light with which the inspection target is irradiated by the irradiator and that passes through a first light path in which the reflected laser light travels from the inspection target toward the measurer, an interference image representing a vibration state of the inspection target as viewed in a direction extending along the first light path, and to acquire, based on interference light of the laser light with which the inspection target is irradiated by the irradiator and that passes through a second light path in which the reflected laser light travels from the inspection target in a direction different from the first light path, an interference image representing a vibration state of the inspection target as viewed in a direction extending along the second light path.

A defect inspection method according to a second aspect of the present invention includes imparting elastic wave vibration to an inspection target to excite the elastic wave vibration in the inspection target; irradiating the inspection target in an excited state in which the elastic wave vibration is excited with laser light; and acquiring, based on interference light of the laser light with which the inspection target is irradiated and that passes through a first light path in which the reflected laser light travels toward a measurer configured to change a phase of the laser light reflected by the inspection target to cause the laser light having an unchanged phase to interfere with the laser light having a changed phase and to measure the interference light, an interference image representing a vibration state of the inspection target as viewed in a direction extending along the first light path, and acquiring, based on interference light of the laser light that passes through a second light path in which the reflected laser light travels from the inspection target in a direction different from the first light path, an interference image representing a vibration state of the inspection target as viewed in a direction extending along the second light path.

Effect of the Invention

In the defect inspection apparatus according to the first aspect, the defect inspection method according to the second aspect of the present invention, based on interference light of the laser light that passes through the first light path in which the reflected laser light travels toward the measurer, which is configured to measure the interference light, an interference image representing a vibration state of the inspection target as viewed in a direction extending along the first light path is acquired. In the defect inspection apparatus according to the first aspect, the defect inspection method according to the second aspect of the present invention, based on interference light of the laser light that passes through a second light path in which the reflected laser light travels from the inspection target in a direction different from the first light path, an interference image representing a vibration state of the inspection target as viewed in a direction extending along the second light path is acquired. Accordingly, because an interference image representing a vibration state of the inspection target as viewed in a direction extending along the first light path in which the reflected laser light travels from the inspection target toward the measurer, which is configured to measure interference light, and an interference image representing a vibration state of the inspection target as viewed in a direction extending along the second light path in which the reflected laser light travels in a direction different from the first light path can be acquired, it is possible to acquire interference images representing vibration states of the inspection target in two different directions. As a result, it is possible to acquire displacements of vibration states of the inspection target as viewed in directions different from each other (two different directions), which are a direction extending along the first light path in which the reflected laser light travels toward the measurer, and a direction extending along the second light path in which the reflected laser light travels in a direction different from the first light path without changing an angle of the inspection target with respect to the measurer. Consequently, because displacements of vibration states of the inspection target as viewed in directions different can be acquired, it is possible to see displacements of vibration states of cracks having various depths (relatively deep crack, relatively shallow crack, etc.). Therefore, it is possible to easily determine whether any crack having any depth is included in an inspection target without changing an angle of the inspection target with respect to a measurer.

Contrary to this, in the known defect inspection apparatuses such as the defect detection apparatus disclosed in the above Japanese Patent Laid-Open Publication No. JP 2017-219318, in a case in which any defect is inspected in a wide area along a curved surface (circumferential direction) of an inspection target having the curved surface such as cylindrical shape, columnar shape, etc., a plurality of inspections are necessarily performed along the curved surface (circumferential direction) of the inspection target, which has the curved surface such as cylindrical shape, columnar shape, etc., while changing a position of the displacement measurer, etc. For this reason, in a case in which an inspection target has the curved surface, it is difficult to easily provide a wider measurement area of the inspection target in which it is determine whether any crack is included without changing positions of the inspection target and the measurer, and consequently the present invention is also intended to solve this problem. That is, in the defect inspection apparatus according to the first aspect, the defect inspection method according to the second aspect of the present invention, because an interference image representing a vibration state of the inspection target as viewed in a direction extending along the first light path, and an interference image representing a vibration state of the inspection target as viewed in a direction extending along the second light path can be acquired, it is possible to acquire interference images representing vibration states in two different directions. As a result, because interference images representing vibration states of an inspection target having a curved surface in a plurality of directions, dissimilar to a case in which an interference image representing a vibration state of such an inspection target having a curved surface only in one direction, it is possible to easily provide a wider measurement area of the inspection target in which it is determine whether any crack is included without changing positions of the inspection target and the measurer. Therefore, the present invention is to provide a defect inspection apparatus and a defect inspection method capable of easily providing a wider measurement area of an inspection target in which it is determine whether any crack is included without changing positions of the inspection target and the measurer in a case in which an inspection target has a curved surface.

MODES FOR CARRYING OUT THE INVENTION

Embodiments embodying the present invention will be described with reference to the drawings.

First Embodiment

A defect inspection apparatus 100 according to a first embodiment embodiment is now described with reference to FIGS. 1 to 8.

(Configuration of Defect Inspection Apparatus)

Figure 1:
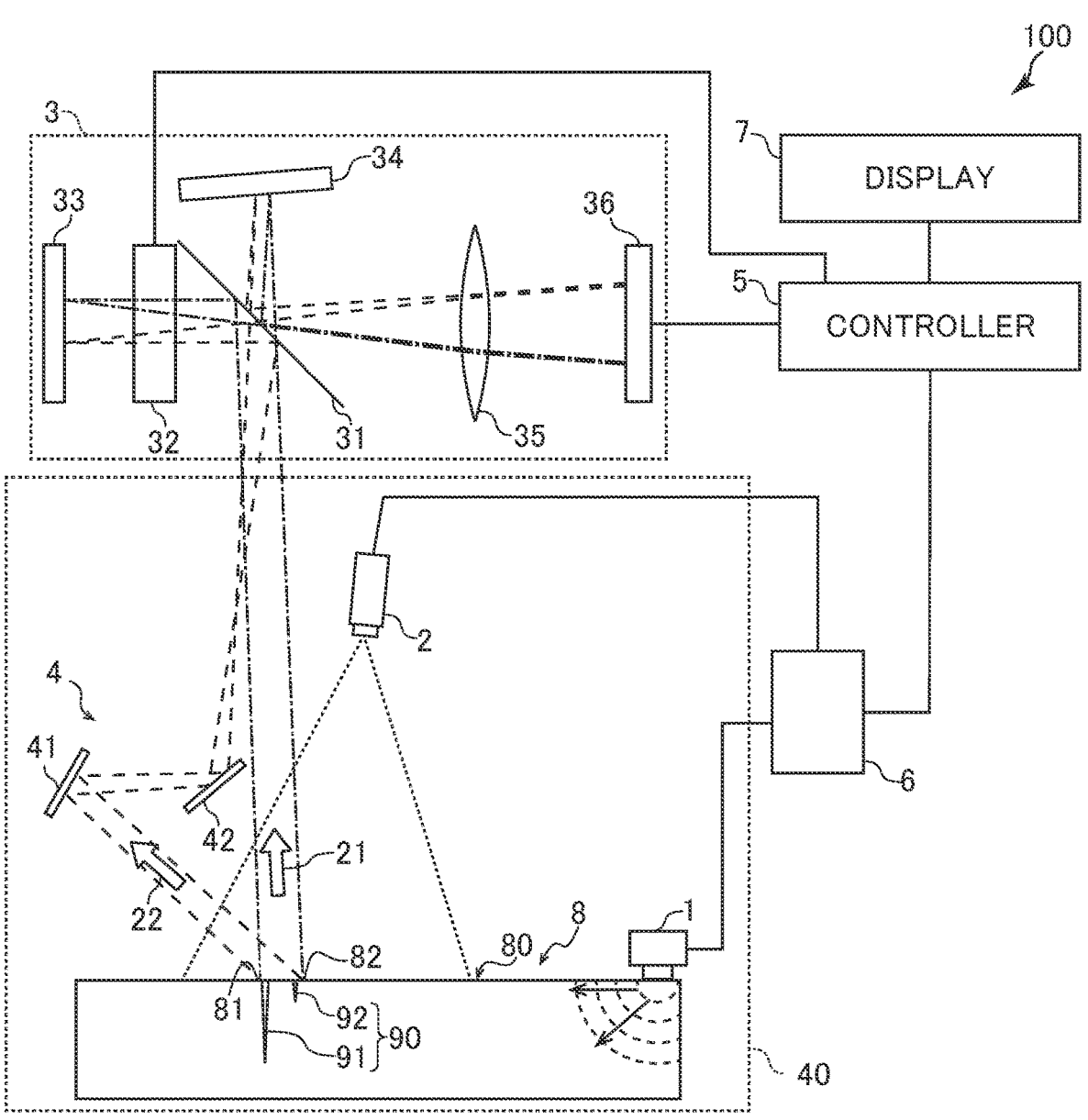
FIG. 1 is a schematic diagram entirely showing a configuration of a defect inspection apparatus according to a first embodiment of the present invention.

The defect inspection apparatus 100 according to the first embodiment includes a vibrator 1, a laser illuminator 2 and a measurer 3 as shown in FIG. 1. The vibrator 1 is an example of an "exciter" in the claims, and the laser illuminator 2 is an example of "illuminator" in the claims.

The defect inspection apparatus 100 includes an optical system 4, a controller 5, a signal generator 6 and display 7. The controller 5 is an example of an "image processor" in the claims.

The defect inspection apparatus 100 is configured to acquire an interference image 70 representing a vibration state of an inspection target 8, which will be described later, and is configured to determine whether any crack of the inspection target 8 (defect 90) is included. The display 7 is configured to display the interference image 70, which represents a vibration state of the inspection target 8, acquired. For example, the display 7 is constructed of a liquid crystal display, an organic electroluminescence (EL) display, etc. For example, the display 7 is connected to the controller 5 through an audio and video interface such as HDMI (registered trademark).

The inspection target 8 is a plate-shaped member. The inspection target 8 is, for example, a painted steel plate on which a coating applied. The inspection target 8 has defects 90 (crack 91 and crack 92). The crack 91 is a relatively deep crack, and the crack 92 is a relatively shallow crack.

The vibrator 1 and the laser illuminator 2 of the defect inspection apparatus 100 are connected to the signal generator 6 through a cable.

The vibrator 1 is configured to receive an alternating current electrical signal from the signal generator 6, and to excite an elastic wave in the inspection target 8. The vibrator 1 is arranged in contact with the inspection target 8, and is configured to convert an alternating electrical signal from the signal generator 6 into mechanical vibration whereby imparting elastic wave vibration and exciting the elastic wave in the inspection target 8.

The laser illuminator 2 is configured to receive an electrical signal from the signal generator 6, and to irradiate the inspection target with laser light. The laser illuminator 2 includes a laser light source and an illumination light lens (not shown). The laser illuminator 2 is configured to irradiate the inspection target 8 in an excited state in which the elastic wave vibration is excited by the vibrator 1 with laser light. The illumination light lens is configured to entirely irradiate a wide measurement area of a surface 80 of the inspection target 8 with laser light emitted by the laser light source.

The vibrator 1, the laser illuminator 2, the optical system 4 and the inspection target 8 are accommodated in a box-shaped case 40. Accordingly, external light does not affect measurement. An opening (not shown) is formed in a part of the case 40 corresponding to the measurer 3 so that laser light that is reflected from the inspection target 8 enters the measurer 3. The vibrator 1, the laser illuminator 2, the optical system 4 and the inspection target 8 may not be accommodated in the box-shaped case 40. That is, the defect inspection apparatus 100 may not include the box-shaped case 40. The laser illuminator 2 is arranged between the surface 80 of the inspection target 8 and the measurer 3.

The measurer 3 includes a beam splitter 31, a phase shifter 32, a first reflecting mirror 33, a second reflecting mirror 34, a condenser lens 35, and an image sensor 36. The measurer 3 includes a speckle shearing interferometer. The measurer 3 is configured to change a phase of laser light reflected by the inspection target 8 to cause the laser light having an unchanged phase to interfere with the laser light having a changed phase, and to measure interference light. The image sensor 36 is an example of an "image capturer" in the claims.

The beam splitter 31 is a half mirror arranged at a position where laser light that is reflected by the surface 80 of the inspection target 8 enters.

The first reflecting mirror 33 is arranged at an angle of 45 degrees with respect to a reflection surface of the beam splitter 31 on a light path of laser light that is reflected by the beam splitter 31.

The second reflecting mirror 34 is arranged at an angle slightly inclined from an angle of 45 degrees with respect to the reflection surface of the beam splitter 31 on a light path of laser light that passes through the beam splitter 31.

The phase shifter 32 is arranged between the beam splitter 31 and the first reflecting mirror 33, and is configured to change (shift) a phase of the passing laser light by the control of the controller 5.

The image sensor 36 includes a light-receiving area 30 (see FIG. 4) for receiving interference light of the laser light that results from interference by the measurer 3. The light-receiving area 30 includes a number of pixels (photodiodes). The image sensor 36 includes, for example, a CMOS (Complementary Metal Oxide Semiconductor) image sensor or a CCD (Charge Coupled Device) image sensor.

The image sensor 36 is arranged on a light path of laser light that is reflected by the beam splitter 31 and then by the first reflecting mirror 33, and passes through the beam splitter 31, and a light path of laser light that passes through the beam splitter 31, and is reflected by the second reflecting mirror 34 and then by the beam splitter 31.

The condenser lens 35 is arranged between the beam splitter 31 and the image sensor 36, and is configured to focus the laser light that is reflected by the beam splitter 31 and the laser light that passes through the beam splitter 31.

The optical system 4 includes a plurality of reflecting mirrors (two reflecting mirrors of the reflecting mirror 41 and the reflecting mirror 42).

In the first embodiment, the optical system 4 (reflecting mirror 41 and reflecting mirror 42) is arranged at a position other than a first light path 21 in which laser light reflected from the inspection target 8 travels toward the measurer 3, and is configured to guide laser light that passes through a second light path 22 toward the measurer 3.

Figure 2:
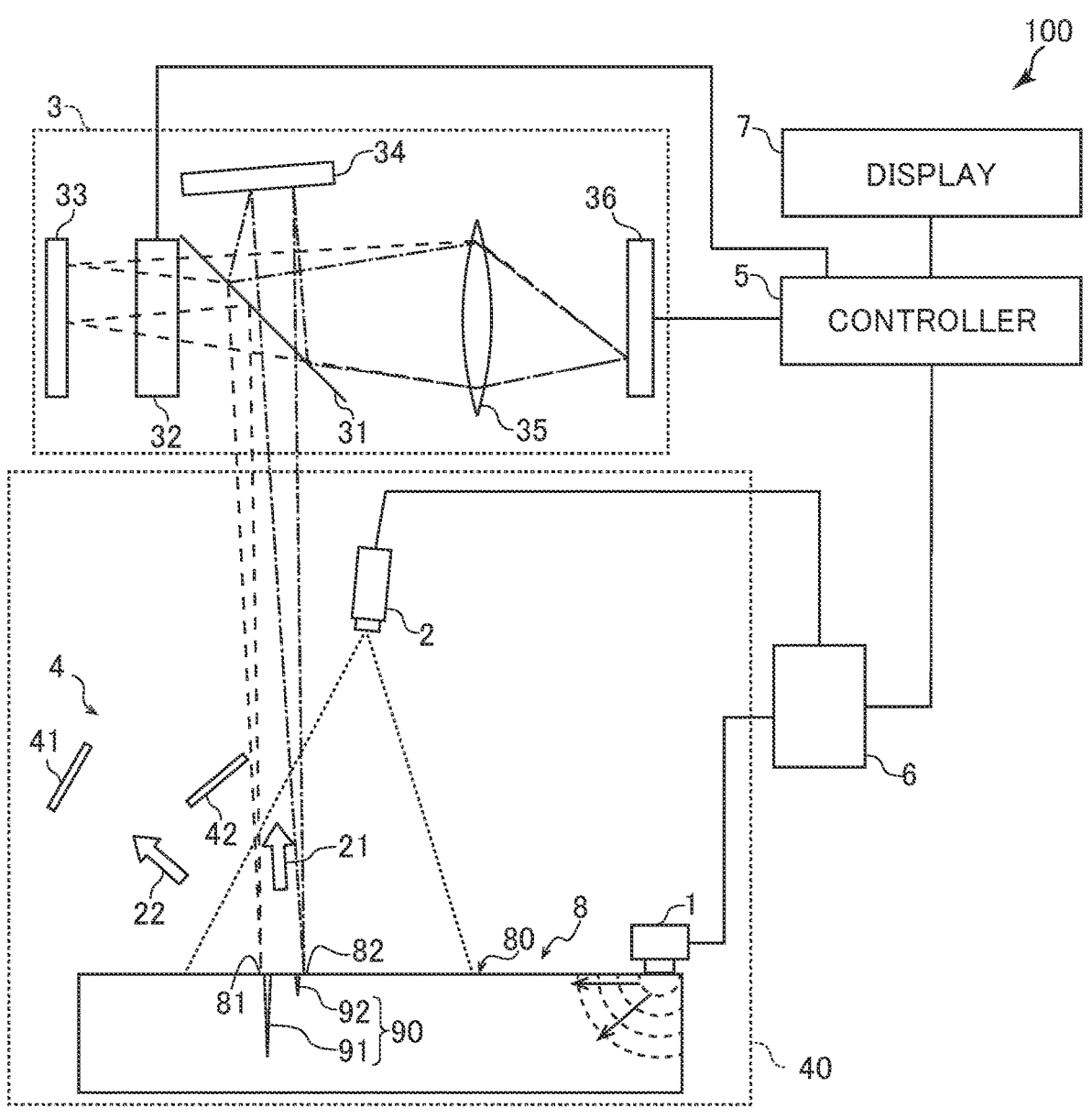
FIG. 2 is a diagram illustrating exemplary convergence and divergence of light that is reflected in a direction extending along a first light path in the first embodiment in relation to image capture based on the light.
Figure 3:
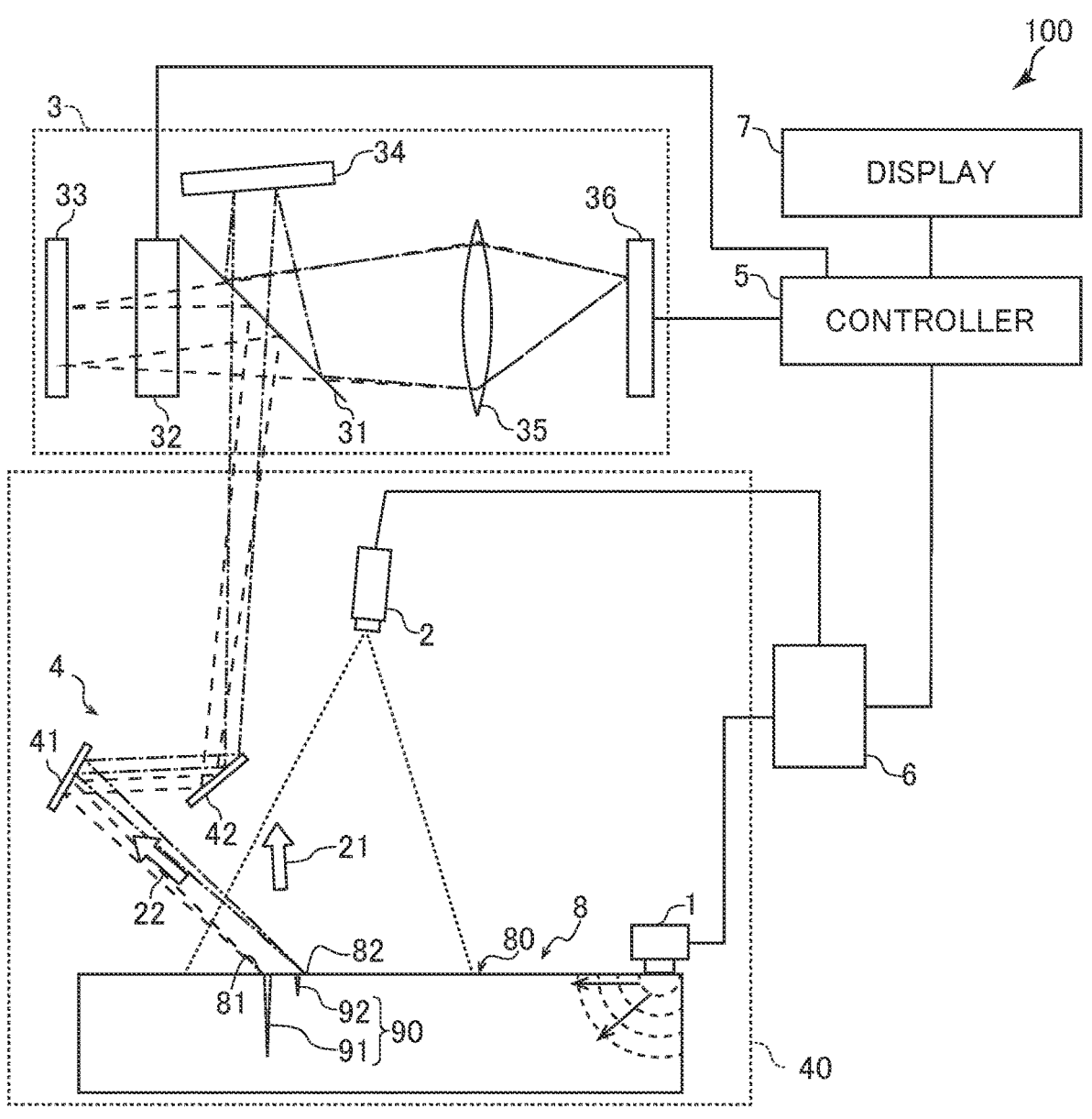
FIG. 3 is a diagram illustrating exemplary convergence and divergence of light that is reflected in a direction extending along a second light path in the first embodiment in relation to image capture based on the light.
Figure 4:
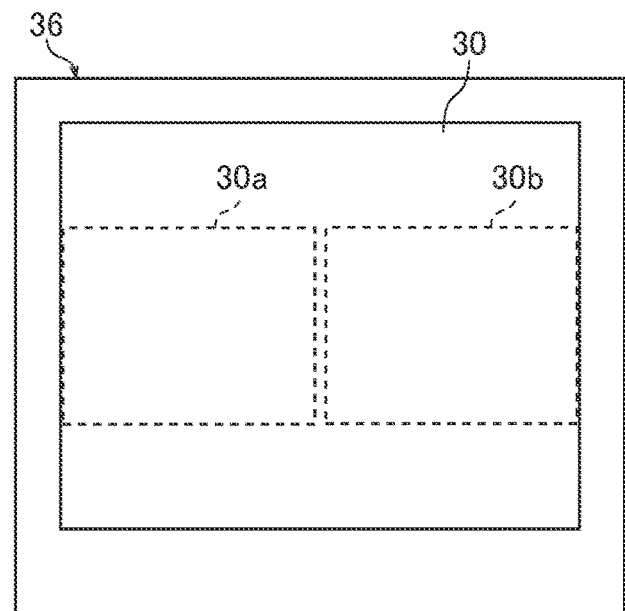
FIG. 4 is a view showing a light-receiving area of an image sensor in the first embodiment.

The optical system 4 is arranged between the measurer 3 and the inspection target 8. The optical system 4 is configured to reflect laser light that passes through the second light path 22 in which the reflected laser light travels in a direction different from the first light path 21 on the reflecting mirror 41 and then on the reflecting mirror 42 so that the laser light that passes through the second light path 22 enters the measurer 3 whereby directing the laser light that passes through the second light path 22 in which the reflected laser light travels in a direction different from the first light path 21 toward the measurer 3. Optical axes of 2 routes on the first light path 21 side are shown by alternate long and short dash lines, and optical axes of 2 routes on the second light path 22 side are shown by dashed lines in FIG. 1. FIG. 2 is a diagram illustrating exemplary convergence and divergence of light that is reflected in a direction extending along the first light path 21 in relation to image capture based on the light. FIG. 3 is a diagram illustrating exemplary convergence and divergence of light that is reflected in a direction extending along the second light path 22 in relation to image capture based on the light.

In the first embodiment, the first light path 21 is interposed between the laser illuminator 2 and the optical system 4 in a direction orthogonal to a direction in which the measurer 3 faces the surface 80 of the inspection target 8. In an arrangement of the laser illuminator 2 and the optical system 4, the laser light with which the inspection target is irradiated by the laser illuminator 2 is not directly incident on reflection surfaces of the reflecting mirrors 41 and 42 of the optical system 4.

Laser light (dashed lines in FIG. 2) that is reflected at an A point 81 on the surface 80 of the inspection target 8 in a direction orthogonal to the surface 80 in a forward direction toward the measurer 3, and passes through the first light path 21 and is then reflected by the first reflecting mirror 33, and laser light (alternate long and short dash lines in FIG. 2) that is reflected at a B point 82 on the surface 80 of the inspection target 8 in the direction orthogonal to the surface 80 in the forward direction toward the measurer 3, and passes through the first light path 21 and is then reflected by the second reflecting mirror 34 interfere with each other and are incident on the same part of the light-receiving area 30 of the image sensor 36.

In addition, laser light (dashed lines in FIG. 3) that is reflected at the A point 81 on the surface 80 of the inspection target 8 in an inclined direction with respect to the surface 80 of the inspection target 8, and passes through the second light path 22 and is then reflected by the first reflecting mirror 33, laser light ((alternate long and short dash lines in FIG. 3) that is reflected at the B point 82 on the surface 80 of the inspection target 8 in an inclined direction with respect to the surface 80 of the inspection target 8, and passes through the second light path 22 and is then reflected by the second reflecting mirror 34, interfere with each other and are incident on the same part of the light-receiving area 30 of the image sensor 36.

Although a point on one side (optical system 4 side) on the surface 80 of the inspection target 8 at which laser light is reflected in the forward direction on the first light path 21, and a point on the one side (optical system 4 side) on the surface 80 of the inspection target 8 at which laser light is reflected in the inclines direction on the second light path 22 are illustratively shown as the same point (A point 81), they may not be the same point. Also, although a point on another side (vibrator 1 side) on the surface 80 of the inspection target 8 at which laser light is reflected in the forward direction on the first light path 21, and a point on the one side (vibrator 1 side) on the surface 80 of the inspection target 8 at which laser light is reflected in the inclines direction on the second light path 22 are illustratively shown as the same point (B point 82), they may not be the same point.

The controller 5 is configured control the phase shifter 32 by using an actuator (not shown) arranged in the measurer 3 whereby changing a phase of laser light that passes through the phase shifter 32.

Accordingly, a phase difference between laser light that is reflected at the A point 81 on the surface 80 of the inspection target 8, and passes through the first light path 21, and laser light that is reflected at the B point 82 on the surface 80 of the inspection target 8, and passes through the first light path 21 is changed. The sensing elements in the light-receiving area 30 of the image sensor 36 are configured to detect intensities of interference light that results from interference between the laser light that is reflected at the A point 81 and passes through the first light path 21, and the laser light that is reflected at the B point 82 and passes through the first light path 21.

Also, a phase difference between laser light that is reflected at the A point 81 on the surface 80 of the inspection target 8, and passes through the second light path 22, and laser light that is reflected at the B point 82 on the surface 80 of the inspection target 8, and passes through the second light path 22 is changed. The sensing elements in the light-receiving area 30 of the image sensor 36 are configured to detect intensities of interference light that results from interference between the laser light that is reflected at the A point 81 and passes through the second light path 22, and the laser light that is reflected at the B point 82 and passes through the second light path 22.

In the first embodiment, the image sensor is configured to capture images of interference light of the laser light that passes through the first light path 21 in which the reflected laser light travels from the inspection target 8 toward the measurer 3, and interference light of the laser light that passes through the second light path 22 in which the reflected laser light travels from the inspection target 8 in a direction different from the first light path 21 and is guided toward the measurer 3 by the optical system 4. In other words, images of interference light of the laser light that passes through the first light path 21 in which the reflected laser light travels from the inspection target 8 toward the measurer 3, and interference light of the laser light that passes through the second light path 22 in which the reflected laser light travels from the inspection target 8 in a direction different from the first light path 21 are captured by the common image sensor (image sensor 36).

The controller 5 includes a CPU (Central Processing Unit), a read only memory (ROM), a random access memory (RAM), etc. The controller 5 is, for example, a personal computer. In addition, the controller 5 includes a nonvolatile memory, a hard disk drive (an HDD: Hard Disk Drive), SSD (Solid State Drive), etc.

In the first embodiment, the measurer 3 is configured to acquire, based on interference light of the laser light with which the inspection target is irradiated by the irradiator 2 and that passes through the first light path 21 in which the reflected laser light travels from the inspection target 8 toward the measurer 3, an interference image (first interference image 71 described later) representing a vibration state of the inspection target 8 as viewed in a direction extending along the first light path 21. Here, a direction of displacement of a vibration state that is obtained (observed) based on the interference image (first interference image 71 described later) representing a vibration state of the inspection target 8 as viewed in a direction extending along the first light path 21 is a direction that bisections an angle formed by the laser illuminator 2 and the first light path 21 (measurer 3 or beam splitter 31) with respect to the inspection target 8. In the first embodiment, the defect inspection apparatus 100 (measurer 3) is configured to acquire an interference image representing a vibration state of the inspection target 8 as viewed in a direction roughly orthogonal to the surface 80 of the inspection target 8 based on interference light of the laser light that passes through the first light path 21.

Specifically, the measurer 3 is configured to acquire, based on interference light of the laser light that passes through the first light path 21 in which the reflected laser light travels from the inspection target 8 in a direction orthogonal to the surface 80 of the inspection target 8 in a frontward direction toward the measurer 3 without passing through the optical system 4, an interference image (first interference image 71) representing a vibration state of the inspection target 8 as viewed in the frontward direction (direction extending along the first light path 21). In other words, the measurer 3 is configured to acquire a first interference image 71 based on interference light of the laser light that passes through the first light path 21 in which the reflected laser light travels from the inspection target 8 directly toward the measurer 3 without passing through the optical system 4.

Also, in the first embodiment, the measurer 3 is configured to acquire, based on interference light of the laser light with which the inspection target is irradiated by the irradiator 2 and that passes through the second light path 22 in which the reflected laser light travels from the inspection target 8 in a direction different from the first light path 21, an interference image (second interference image 72 described later) representing a vibration state of the inspection target 8 as viewed in a direction extending along the second light path 22. Here, a direction of displacement of a vibration state that is obtained (observed) based on the interference image (second interference image 72 described later) representing a vibration state of the inspection target 8 as viewed in a direction extending along the second light path 22 is a direction that bisections an angle formed by the laser illuminator 2 and the second light path 22 (reflecting mirror 41) with respect to the inspection target 8. In the first embodiment, the defect inspection apparatus 100 (measurer 3) is configured to acquire an interference image representing a vibration state of the inspection target 8 as viewed in an inclined direction with respect to a direction orthogonal to the surface 80 of the inspection target 8 (a direction between the direction orthogonal to the surface 80 of the inspection target 8 and a direction parallel to the surface 80) based on interference light of the laser light that passes through the second light path 22.

Specifically, the measurer 3 is configured to acquire, based on interference light of the laser light that is guided toward the measurer 3 by the optical system 4 (reflecting mirrors 41 and 42) to pass through the second light path 22 in which the reflected laser light travels from a common surface (surface 80) common to the surface of the inspection target 8 by which the laser light is reflected toward the first light path 21 leading to the measurer 3 in a direction inclined with respect to the common surface dissimilar to the first light path 21, an interference image (second interference image 72) representing a vibration state of the inspection target 8 as viewed in the inclined direction. In other words, the measurer 3 is configured to acquire a second interference image 72 based on interference light of the laser light that passes through the second light path 22 in which the reflected laser light is guided by the optical system 4 toward the measurer 3. An angle of the inclination of the second light path 22 with respect to the surface 80 of the inspection target 8 is smaller than 60°. The angle of inclination of the second light path 22 with respect to the surface 80 of the inspection target 8 is, for example, an angle from 30° to 45°. That is, the measurer 3 is configured to acquire an interference image (second interference image 72) representing a vibration state of the inspection target 8 as viewed in a direction inclined an angle smaller than 60° (e.g., an angle from 30° to 45°) with respect to the surface 80 of the interfering inspection target 8 (direction extending along the surface 80 of the inspection target 8).

(Configuration for Acquiring of First and Second Interference Images)

The measurer 3 is configured to receive interference light of the laser light that passes through the first light path 21 in which the reflected laser light travels from the surface 80 of the inspection target 8 in an area 30a (see FIG. 4) of the light-receiving area 30 in the image sensor 36 whereby acquiring the first interference image 71. The measurer 3 is configured to receive interference light of the laser light that passes through the second light path 22 in which the reflected laser light travels from the surface 80 of the inspection target 8 in an area 30b (see FIG. 4) of the light-receiving area 30 in the image sensor 36 whereby acquiring the second interference image 72.

That is, in the first embodiment, the measurer 3 is configured to receive interference light of the laser light that passes through the first light path 21 in which the reflected laser light travels from the common surface (surface 80) of the inspection target 8 and interference light of the laser light that passes through the second light path 22 in which the reflected laser light travels from the common surface (surface 80) of the inspection target 8 in a plurality of areas (area 30a and area 30b) of the light-receiving area 30 that are defined by dividing the light-receiving area into the plurality of areas corresponding to the interference light of the laser light that passes through the first light path 21 and the interference light of the laser light that passes through the second light path 22 whereby simultaneously acquiring the first interference image 71 and the second interference image 72.

Figure 5:
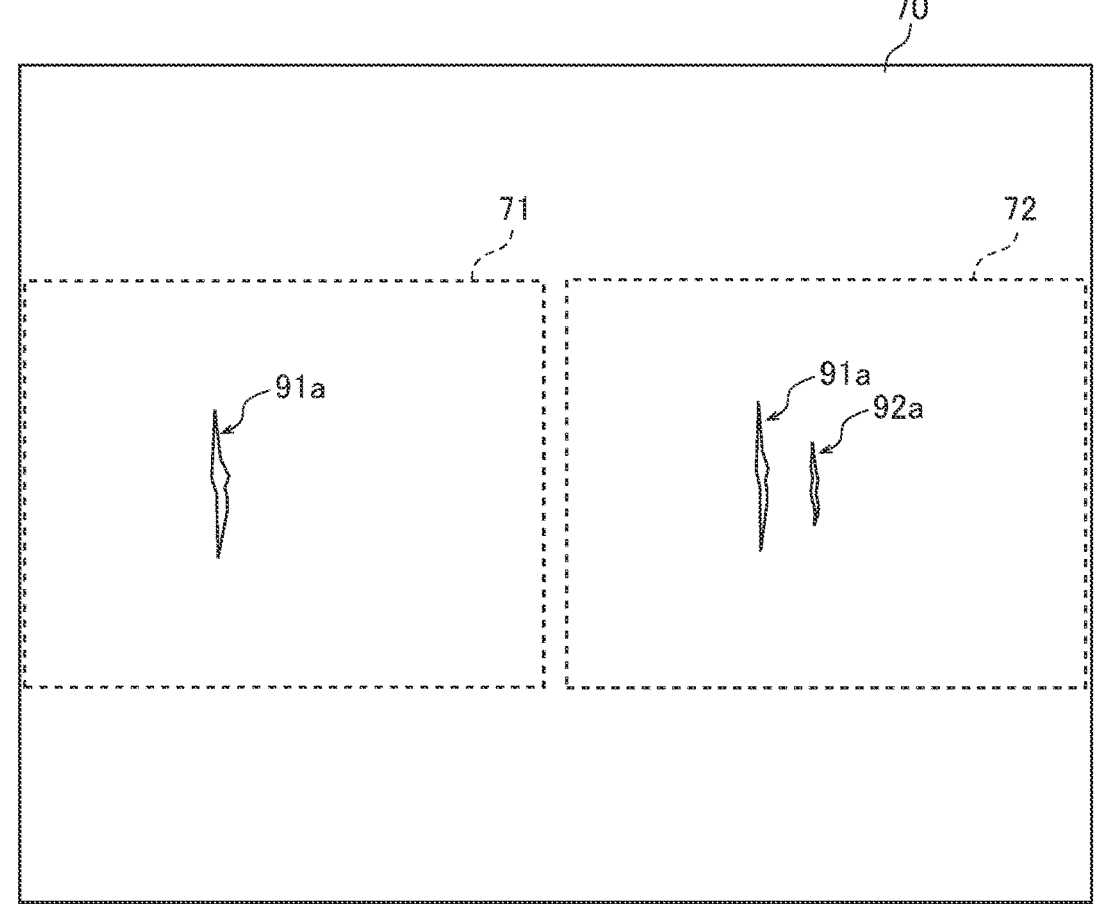
FIG. 5 is a view showing an exemplary interference image in the first embodiment.

As shown in FIG. 5, the interference image 70 acquired based on interference light received in the light-receiving area 30 of the image sensor 36 includes the first interference image 71 acquired based on interference light of laser light that passes through the first light path 21 and is received in the area 30a (see FIG. 4) of the light-receiving area 30, and the second interference image 72 acquired based on interference light of laser light that passes through the second light path 22 and is received in the area 30b (see FIG. 4) of the light-receiving area 30.

Figure 6:
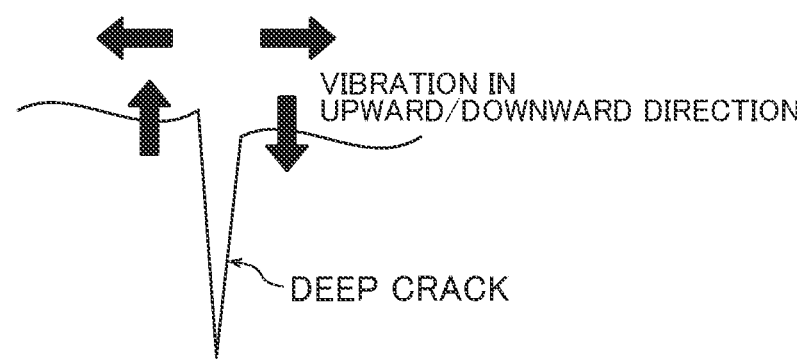
FIG. 6 is a view showing a vibration caused by a relatively deep crack in a vibration state of an inspection target.
Figure 7:
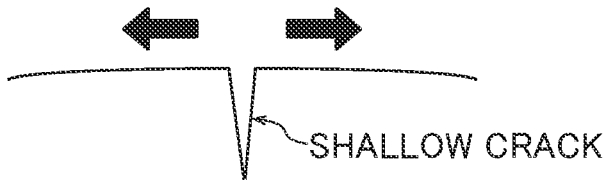
FIG. 7 is a view showing a vibration caused by a relatively shallow crack in a vibration state of an inspection target.
Figure 8:
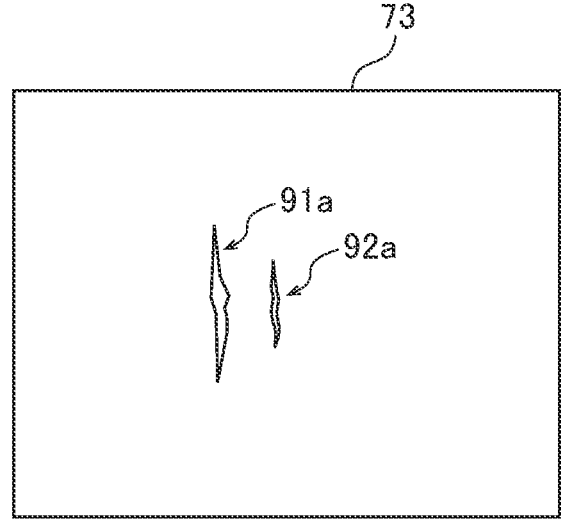
FIG. 8 is a view showing an exemplary composite image in the first embodiment.

In a case of a relatively deep crack shown as the crack 91 (see FIG. 1), when elastic wave vibration is excited in the inspection target 8, vibration in an upward/downward direction (direction orthogonal to the surface 80 of the inspection target 8) and vibration in a surface direction (an opening/closing direction in which the crack opens and closes), which are different from normal vibration of the inspection target 8, appear in In a part corresponding to the crack 91 in the inspection target 8 as shown in FIG. 6. Accordingly, discontinuity of a vibration state in the upward/downward direction and the surface direction appears in the part corresponding to the crack 91 in the inspection target 8. Also, in a case of a relatively shallow crack shown as the crack 92 (see FIG. 1), when elastic wave vibration is excited in the inspection target 8, vibration in the surface direction extending along the surface 80 of the inspection target 8 (an opening/closing direction in which the crack 92 opens and closes), which is different from normal vibration of the inspection target 8, appear in a part corresponding to the crack 92 in the inspection target 8 as shown in FIG. 7. Accordingly, discontinuity of a vibration state in the surface direction appears in the part corresponding to the crack 92 in the inspection target 8.

The first interference image 71 (see FIG. 5) is an interference image acquired based on interference light of the laser light that passes through the first light path 21 in which the reflected laser light travels from the inspection target 8 in a frontward direction toward the measurer 3 in a direction orthogonal to the surface 80 of the inspection target 8 (a direction in which the measurer 3 faces the surface 80 of the inspection target 8) to represents a vibration state of the inspection target 8 as viewed in the frontward direction (direction extending along the first light path 21). In other words, the first interference image 71 (see FIG. 5) is an interference image that representing a vibration state of the inspection target 8 in the upward/downward direction (direction orthogonal to the surface 80 of the inspection target 8). As a result, in the first interference image 71, displacement 91a of a vibration state (displacement in the upward/downward direction of a vibration state) caused by the relatively deep crack can be easily detected. That is, it is possible to easily detect the displacement 91a of a vibration state (displacement in the upward/downward direction of a vibration state) caused by the relatively deep crack shown as the crack 91 (see FIG. 1) in the first interference image 71 as shown in FIG. 5.

The second interference image 72 (see FIG. 5) is an interference image acquired based on interference light of the laser light that passes through the second light path 22 in which the reflected laser light travels in a direction inclined with respect to the surface 80 of the inspection target 8 to represent a vibration state of the inspection target 8 as viewed in the inclined direction. For this reason, the displacement of a vibration state caused by a relatively light crack shown as the crack 92 (see FIG. 1) (displacement in the surface direction of the vibration state) can be considered as the displacement 92b (see FIG. 5), which is the displacement in the surface direction of the vibration state as viewed in the inclined direction. As a result, displacement of a vibration state (displacement in the surface direction of a vibration state) caused by the relatively shallow crack can be easily detected in the second interference image 72 as compared with the first interference image 71. That is, it is possible to easily detect the displacement of a vibration state (displacement in the surface direction of a vibration state) caused by the relatively shallow crack shown as the crack 92 (see FIG. 1) as the displacement 92b in addition to the displacement 91a of a vibration state (displacement in the upward/downward direction of a vibration state) caused by the relatively deep crack shown as the crack 91 (see FIG. 1) in the second interference image 72 as shown in FIG. 5.

In the first embodiment, the optical system 4 includes an even number of reflecting mirrors (two reflecting mirrors of the reflecting mirror 41 and the reflecting mirror 42) so that laser light that passes through the first light path 21 is measured by the measurer 3 after reflected by the reflecting mirror 41 and the reflecting mirror 42. According to this arrangement, because the second interference image 72 can be acquired without being laterally inverted in relation to the first interference image 71, image processing for laterally inverting the second interference image 72 is not required so that the second interference image can be simply displayed and be simply combined with the first interference image.

The controller 5 is configured to acquire a composite image 73 (see FIG. 8) by combining the first interference image 71 (see FIG. 5) representing a vibration state as viewed in a direction orthogonal to the surface 80 of the inspection target 8 in the frontward direction toward the measurer 3 and the second interference image 72 (see FIG. 5) representing a vibration state as viewed in the direction inclined with respect to the surface 80 of the inspection target 8 in a measurement area of the inspection target 8. Because the first interference image 71 and the second interference image 72 are captured to acquire displacement of vibration states in different directions, the first and the second interference images have different aspect ratios. For this reason, the controller 5 is configured to correct distortion of at least the second interference image 72 (image correction processing) when combining the first interference image 71 and the second interference image 72.

For example, the controller 5 is configured to correct distortion of the second interference image to adjust the second interference image 72 to the first interference image 71. The controller 5 can match a measurement area (imaging area) of the second interference image 72 to a measurement area similar to the first interference image 71 by correcting the distortion of the second interference image 72 (aspect ratio correction and keystone correction). The controller 5 or a user then compares the defect part between the corrected second interference image 72 and the first interference image 71. Also, the first Interference Image 71 (image captured in the frontward direction) is not a completely front image (image representing a vibration state as viewed in completely the frontward direction), and may have certain distortion. In this case, image correction (distortion correction) such as aspect ratio correction and keystone correction is also applied to the first interference image 71 (image captured in the frontward direction). According to the defect inspection apparatus 100, when this image correction processing is applied, the image that is captured to represent a vibration state as viewed in the frontward direction (vibration state in a direction that is generally orthogonal to the surface 80 of the inspection target 8), and the image that is captured to represent a vibration state as viewed in the inclined direction can be compared or combined by using analysis processing in the similar measurement area (imaging area) and similar positional relationship.

Alternatively, image correction may be applied only to the second interference image 72 (image captured in the inclined direction) based on reference point (four corner) data in image captured of the first interference image 71 and the second interference image 72. Accordingly, the defect part in the corrected second interference image 72 and the first interference image 71 (image captured in the frontward direction) without correction can be compared in the similar measurement area (imaging area) and similar positional relationship. The correction processing is not limited to the aforementioned processing as long as the first interference image 71 and the second interference image 72 can be matched to each other by the distortion correction. The defect inspection apparatus 100 can store (save) images before correction (first interference image 71 and second interference image 72), corrected images, and the composite image 73 in a memory (storage) inside or outside the controller 5. It may be determined whether the images before correction, the corrected images, and the composite image 73 are stored (saved) in accordance with change of setting by a user in the storage (saving) of these images.

The controller 5 controls the timing of the vibration of the vibrator 1 and the irradiation of the laser light of the laser illuminator 2 through the signal generator 6, and captures (acquires) the interference image 70 (first interference image 71 and second interference image 72) while changing the phase shift amount by using the measurer 3. The controller 5 changes the phase shift amount by λ/4, and a total of 37 images, i.e., 32 interference images 70 (first interference images 71 and second interference images 72) at the timing j (j=0 to 7) of the laser radiation and 5 images without laser radiation corresponding to unchanged and changed phases of before and after each shift amount (0, λ/4, λ/2, 3λ/4), are captured by using the measurer 3, at every phase shift amount (0, λ/4, λ/2, 3λ/4). Note that A is the wavelength of the laser light.

The controller 5 processes detection signals from detecting elements in the light-receiving area 30 of the image sensor 36 in the following procedures to acquire a moving image representing vibration states (spatial distribution image of the vibration state) based on the interference images 70 (first interference images 71 and second interference images 72) and the images without irradiation The optical phase (phase difference between two light paths when the phase shift amount is 0) $\Phi_j$ is obtained from the luminance values $I_{j0}$ to $I_{j3}$ of images (four images) in which the timing j (j=0 to 7) of the laser irradiation is the same and the phase shift amount of the laser irradiation differs by λ/4, by the following Equation (1).

$$\Phi_j = -\arctan\{(I_{j3} - I_{j1})/(I_{j2} - I_{j0})\} \qquad (1)$$

The sine wave approximation on the optical phase $\Phi_j$ is performed by a least-squares method to obtain the approximation coefficients A, θ, and C in Equation (2).

$$\Phi_j = A\cos(\theta + j\pi/4) + C = Bexp(j\pi/4) + C \qquad (2)$$

where B is a complex amplitude and is expressed by Equation (3).

$$B = Aexp(i\theta): \text{complex amplitude} \qquad (3)$$

Here, the complex amplitude B is image information (two-dimensional spatial information of complex amplitude)

that is used as basic information to provide a moving image representing vibration states (spatial distribution image of the vibration state) in the measurement area of the inspection target 8. Moving images (30 to 60 frames) for displaying the optical phase change at each phase time $\xi$ ($0 \leq \xi < 2\Pi$) of the vibration are generated from the approximate expression obtained by removing the constant term C from Equation (2), and are provided as the moving image representing vibration states (spatial distribution image of the vibration state) in the measurement area of the inspection target 8. As the images to generate the moving image representing vibration states (spatial distribution image of the vibration state), the interference images 70 (first interference images 71 and second interference images 72) or the composite images 73. The controller 5 may use the first interference images 71 and the second interference images generate two types of moving images representing vibration states (spatial distribution images of the vibration states) corresponding to the first and second interference images, and combine the two types of moving images representing vibration states (spatial distribution image of the vibration state), which are generated by using the first interference images 71 and the second interference images 72.

In the aforementioned procedure, a spatial filter is appropriately applied to the complex amplitude B in order to remove noise. The amount of phase shift and the step of the laser irradiation timing ($\lambda/4$ and T/8, respectively, in the example above, where T is the period of oscillation) are not limited to this. In this case, the equation is different from above Equations (1) to (3).

The controller 5 can apply a spatial filter and detect a discontinuous area in the vibration state as the defect 90 of the inspection target 8 from the aforementioned moving image representing vibration states. In this detection, in a case where the shape of the inspection target 8 itself includes irregularities or the like, because discontinuous of vibration state may occur even at a boundary between a flat part and an uneven part, the defect 90 may be detected in consideration of shape information on the inspection target 8 to exclude such irregularities from the defect to be detected. The controller 5 may use information on interference light such as the interference images 70 (first interference images 71 and second interference images 72), which are used as basic information to provide a moving image representing vibration states in order to detect the defect 90.

The controller 5 is configured to display the moving image representing vibration states on the display 7. The display 7 displays the moving image representing vibration states in the measurement area of the inspection target 8 based on the control by the controller 5.

The controller 5 is configured to display the interference image 70 (first interference image 71 and second interference image 72) representing a vibration state of the inspection target 8 or the composite image 73 generated by combining the first and second interference images on the display 7. The display 7 displays the interference image 70 (first interference image 71 and second interference image 72) representing a vibration state of the inspection target 8 or the composite image 73 based on the control by the controller 5.

The display 7 may selectively display one of the moving image representing vibration states in the measurement area of the inspection target 8, the interference image 70 (first interference image 71 and second interference image 72), and composite image 73, or the display 7 may display a plurality of images and the moving image together.

Advantages of First Embodiment

In the first embodiment, the following advantages are obtained.

In the defect inspection apparatus 100 and a defect inspection method according to the first embodiment, based on an interference light of the laser light that passes through the first light path 21, a first interference image 71 representing a vibration state of the inspection target 8 as viewed in a direction extending along the first light path 21 in which the reflected laser light travels toward the measurer 3, which is configured to measure the interference light, is acquired. In addition, based on an interference light of the laser light that passes through the second light path 22 in which the reflected laser light travels from the inspection target 8 in a direction different from the first light path 21, a second interference image 72 representing a vibration state of the inspection target 8 as viewed in a direction extending along the second light path 22 is acquired. Accordingly, because the first interference image 71 representing a vibration state of the inspection target 8 as viewed in a direction extending along the first light path 21 in which the reflected laser light travels toward the measurer 3, which is configured to measure interference light, and the second interference image 72 representing a vibration state of the inspection target 8 as viewed in a direction extending along the second light path 22 in which the reflected laser light travels in a direction different from the first light path 21 can be acquired, it is possible to acquire interference images (first interference image 71 and second interference image 72) representing vibration states of the inspection target 8 in two different directions. As a result, it is possible to acquire displacements of vibration states of the inspection target 8 as viewed in directions different from each other (two different directions), which are a direction extending along the first light path 21 in which the reflected laser light travels toward the measurer 3, and a direction extending along the second light path 22 in which the reflected laser light travels in a direction different from the first light path 21 without changing an angle of the inspection target 8 with respect to the measurer 3. Consequently, because displacements of vibration states of the inspection target 8 as viewed in directions different can be acquired, it is possible to see displacements of vibration states of cracks having various depths (relatively deep crack, relatively shallow crack, etc.). Therefore, it is possible to easily determine whether any crack having any depth is included in the inspection target 8 without changing an angle of the inspection target 8 with respect to the measurer 3.

In addition, following additional advantages can be obtained by the defect inspection apparatus 100 according to the first embodiment added with configurations discussed below.

In the defect inspection apparatus 100 according to the first embodiment, as discussed above, the optical system 4 is configured to guide laser light that passes through the second light path 22 in which the reflected laser light travels in a direction different from the first light path 21 toward the measurer 3. According to this configuration in which the optical system 4 is configured to guide laser light that passes through the second light path 22 in which the reflected laser light travels in a direction different from the first light path 21 toward the measurer 3, it is possible to easily acquire, based on the laser light that passes through the second light path 22, an interference image (second interference image 72) representing a vibration state of the inspection target 8. Also, according to this configuration in which the optical system 4 is configured to guide laser light that passes through the second light path 22 toward the measurer 3, the laser light that passes through the first light path 21 and the laser light that passes through the second light path 22 can be incident on a common measurer (measurer 3). As a result, increase of the number of parts can be prevented while preventing a size increase of the apparatus as compared with a case in which measurers 3 are provided corresponding to the laser light that passes through the first light path 21 and the laser light that passes through the second light path 22.

In the defect inspection apparatus 100 according to the first embodiment, as discussed above, a common image sensor (image sensor 36) is configured to capture images of interference light of the laser light that passes through the first light path 21 in which the reflected laser light travels from the inspection target 8 toward the measurer 3, and interference light of the laser light that passes through the second light path 22 in which the reflected laser light travels from the inspection target 8 in a direction different from the first light path 21 and is guided toward the measurer 3 by the optical system 4. As a result, increase of the number of parts can be prevented, and the configuration of the apparatus can be simple as compared with a case in which image sensors (image capturer) are provided corresponding to interference light of the laser light that passes through the first light path 21 and interference light of the laser light that passes through the second light path 22.

In the defect inspection apparatus 100 according to the first embodiment, as discussed above, the measurer 3 is configured to acquire, based on interference light of the laser light that passes through the first light path 21 in which the reflected laser light travels from the inspection target 8 in a direction orthogonal to the surface 80 of the inspection target 8 in a frontward direction toward the measurer 3 without passing through the optical system 4, an interference image (first interference image 71) representing a vibration state of the inspection target 8 as viewed in the frontward direction (direction extending along the first light path 21). Accordingly, because displacement (displacement 91a) in a direction (upward/downward direction) orthogonal to the surface 80 of the inspection target 8 can be acquired from an interference image (first interference image 71) representing a vibration state of the inspection target 8 as viewed in a direction (frontward direction) extending along the first light path 21, it is possible to determine whether a relatively deep crack (crack 91) is included. In addition, the measurer 3 is configured to acquire, based on interference light of the laser light that passes through the second light path 22 in which the reflected laser light travels in a direction inclined with respect to a common surface (surface 80) by which the laser light is reflected toward the first light path 21 leading the measurer 3 and which is common to the surface of the inspection target 8, an interference image (second interference image 72) representing a vibration state of the inspection target 8 as viewed in the inclined direction. Accordingly, because, from an interference image (second interference image 72) representing a vibration state of the inspection target 8 as viewed in an inclined direction with respect to a common surface (surface 80) common to the surface of the inspection target 8, displacement in a direction (surface direction) extending along the surface 80 of the inspection target 8 can be acquired as displacement (displacement 92a) in an inclined direction relative to close to a direction (upward/downward direction) orthogonal to the surface 80 of the inspection target 8, it is possible to determine whether a relatively shallow crack (crack 92) is included. Therefore, it is possible to easily determine whether a relatively shallow crack (crack 92) is included in addition to whether a relatively deep crack (crack 91) is included without changing a position of the inspection target 8.

As discussed above, the defect inspection apparatus 100 according to the first embodiment is configured to receive interference light of the laser light that passes through the first light path 21 and interference light of the laser light that passes through the second light path 22 in a plurality of areas (area 30a and area 30b) of the light-receiving area 30 that are defined by dividing the light-receiving area into the plurality of areas corresponding to the interference light of the laser light that passes through the first light path 21 and the interference light of the laser light that passes through the second light path 22 whereby simultaneously acquiring the first interference image 71 and the second interference image 72. Accordingly, because the first interference image 71 based on interference light of the laser light that passes through the first light path 21, and the second interference image 72 based on interference light of the laser light that passes through the second light path 22 can be simultaneously acquired, it is possible to reduce inspection time required to determine whether any defect (defect 90) is included in the inspection target 8.

In the defect inspection apparatus 100 according to the first embodiment, as discussed above, the controller 5 is configured to acquire a composite image 73 by combining the first interference image 71 representing a vibration state as viewed in a direction orthogonal to the surface 80 of the inspection target 8 in the frontward direction toward the measurer 3 and the second interference image 72 representing a vibration state as viewed in the direction inclined with respect to the surface 80 of the inspection target 8 in a measurement area of the inspection target 8. Accordingly, because displacement (displacement 91a and displacement 92a) of a vibration state as viewed in a plurality of directions can be simultaneously represented by composite image 73, users can easily visually determine whether any crack having any depth is included.

In the defect inspection apparatus 100 according to the first embodiment, as discussed above, the controller 5 is configured to correct distortion of at least the second interference image 72. Accordingly, because the controller 5 corrects distortion of the second interference image 72, it is possible to easily compare a defect (defect 90) between the first interference image 71 and the second interference image 72, in which displacement of a vibration state is acquired in different acquisition directions different from each other, and to easily combine the first interference image 71 and the second interference image 72 (to easily generate the composite image 73).

Second Embodiment

Figure 9:
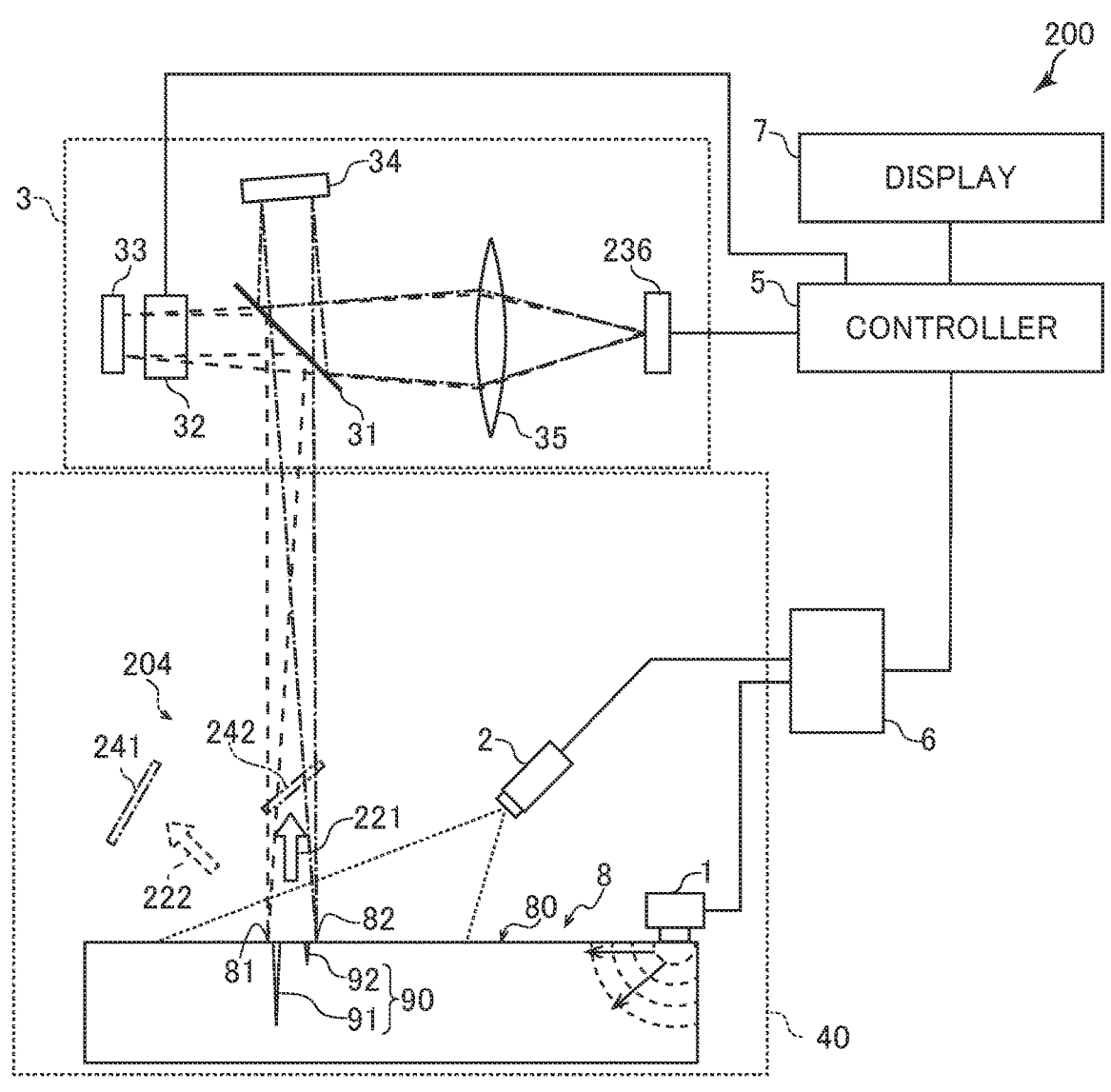
FIG. 9 is a first schematic diagram entirely showing a configuration of a defect inspection apparatus according to a second embodiment of the present invention, and is a diagram illustrating exemplary convergence and divergence of light that is reflected in a direction extending along a first light path in relation to image capture based on the light.
Figures 10, 11:
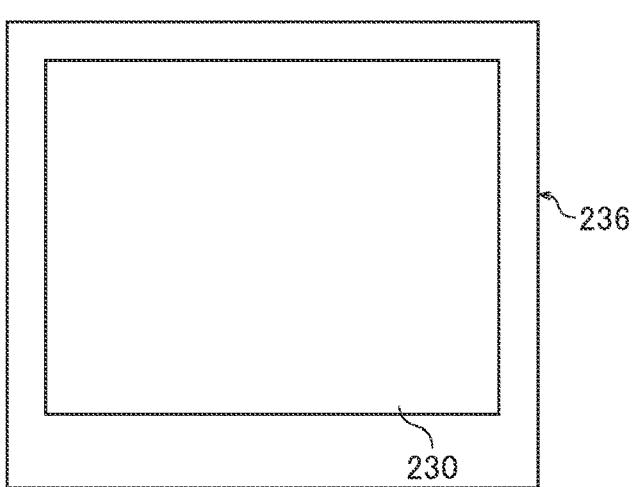
FIG. 10 is a second schematic diagram entirely showing a configuration of a defect inspection apparatus according to the second embodiment of the present invention, and is a diagram illustrating exemplary convergence and divergence of light that is reflected in a direction extending along a second light path in relation to image capture based on the light.
FIG. 11 is a view showing a light-receiving area of an image sensor in the second embodiment.
Figure 12:
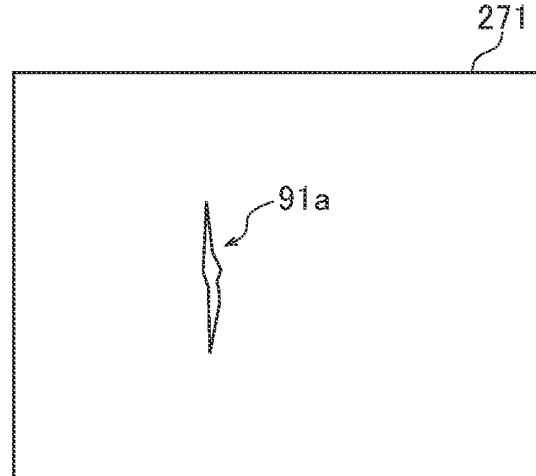
FIG. 12 is a view showing an exemplary first interference image in the second embodiment.

A defect inspection apparatus 200 according to a second embodiment embodiment is now described with reference to FIGS. 9 to 14. The same configurations in the Figures as those of the first embodiment are denoted by the same reference numerals. FIG. 9 is a diagram illustrating exemplary convergence and divergence of light that is reflected in a direction extending along a first light path 221 in relation to image capture based on the light. FIG. 10 is a diagram illustrating exemplary convergence and divergence of light that is reflected in a direction extending along the second light path 222 in relation to image capture based on the light.

Dissimilar to the first embodiment in which the first interference image 71 and the second interference image 72 are simultaneously acquired, in the second embodiment, a first interference image 271 and a second interference image 272 are separately acquired by changing interference light of laser light to be received.

The defect inspection apparatus 200 includes an optical system including a reflecting mirror 241 and a reflecting mirror 242. The optical system 204 is arranged between the measurer 3 and the inspection target 8 in a direction in which the surface 80 of the inspection target 8 faces the measurer 3 as shown in FIGS. 9 and 10. A part (reflecting mirror 242) of the optical system 204 is arranged on the first light path 221.

In the defect inspection apparatus 200 according to the second embodiment, a position of the optical system 204 can be changed in the case 40. In the defect inspection apparatus 200, laser light that is reflected on the surface 80 of the inspection target 8 is then incident on the measurer 3 can be changed between laser light that passes through the first light path 221 and laser light that passes through the second light path 222 by changing the position of the optical system 204.

Specifically, the defect inspection apparatus 200 is configured to be able to move (shift) positions of the reflecting mirrors 241 and 242 in a direction intersecting the direction in which the measurer 3 faces the inspection target 8 by using actuators (not shown), etc. According to this configuration, the defect inspection apparatus 200 (measurer 3) can switch between an arrangement in which laser light that passes through the first light path 221 is incident on the measurer 3 (see FIG. 9), and an arrangement in which optical system 204 (reflecting mirror 242) is arranged on the first light path 221 to cut off laser light that travels on the first light path 221 while laser light that is guided by the optical system 204 and passes through the second light path 222 is incident on measurer 3 (see FIG. 10) by moving the positions of the reflecting mirrors 241 and 242 The position of the optical system 204 may be changed in accordance with control by the controller 5, or an instruction by a user. In the defect inspection apparatus 200, laser light that is incident on the measurer 3 can be changed between laser light that passes through the first light path 221 and laser light that passes through the second light path 222 by moving only the position of the reflecting mirror 242. Angles of the reflecting mirrors 241 and 242 may be changed by actuators (not shown).

The measurer 3 includes a common image sensor (image sensor 236) that is configured to capture images of interference light of the laser light that passes through the first light path 221 in which the reflected laser light travels from the inspection target 8 toward the measurer 3, and interference light of the laser light that passes through the second light path 222 in which the reflected laser light travels from the inspection target 8 in a direction different from the first light path 221.

In the second embodiment, images of interference light of the laser light that passes through the first light path 221 in which the reflected laser light travels from the inspection target 8 toward the measurer 3, and interference light of the laser light that passes through the second light path 222 in which the reflected laser light travels from the inspection target 8 in a direction different from the first light path 221 are captured by the common image sensor (image sensor 236).

Figure 13:
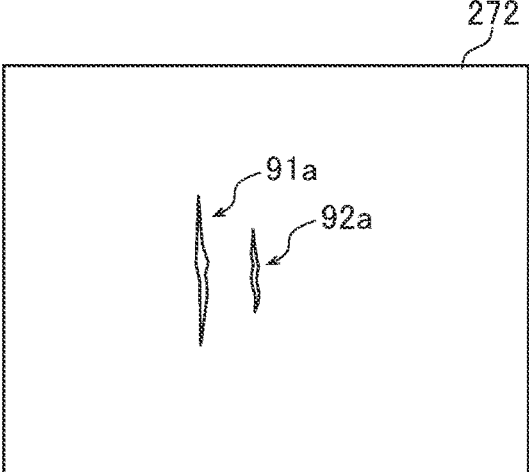
FIG. 13 is a view showing an exemplary second interference image in the second embodiment.
Figure 14:
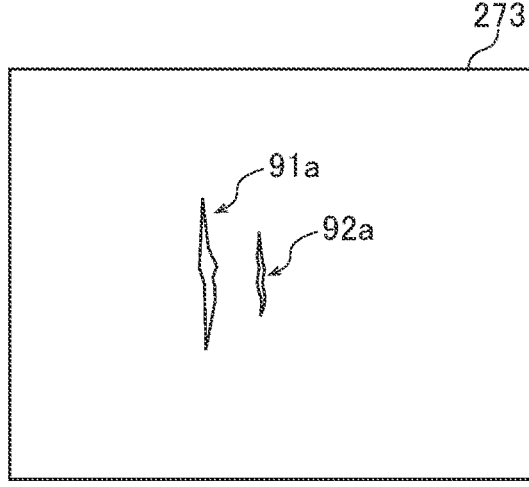
FIG. 14 is a view showing an exemplary composite image in the second embodiment.

In the second embodiment, as shown in FIG. 11, the measurer 3 is configured to switch interference light of the laser light to be received in a common area (light-receiving area 230) of the light-receiving area of the image sensor 236 between interference light of the laser light that passes through the first light path 221 in which the reflected laser light travels from the common surface (surface 80) of the inspection target 8 and interference light of the laser light that passes through the second light path 222 in which the reflected laser light travels from the common surface of the inspection target whereby acquiring the first interference image 271 (see FIG. 12) and the second interference image 272 (see FIG. 13). It is possible to easily detect the displacement 92a of a vibration state (displacement in the surface direction of a vibration state) caused by the relatively shallow crack shown as the crack 92 (see FIG. 9) in addition to the displacement 91a of a vibration state (displacement in the upward/downward direction of a vibration state) caused by the relatively deep crack shown as the crack 91 (see FIG. 9) in the second interference image 272 (see FIG. 13) as compared with the first interference image 271 (see FIG. 12). Here, a direction of displacement of a vibration state that is obtained (observed) based on the first interference image 271 (see FIG. 12) is a direction that bisects an angle formed by the laser illuminator 2 and the first light path 221 (measurer 3 or beam splitter 31) with respect to the inspection target 8 similar to the foregoing first embodiment. Also, a direction of displacement of a vibration state that is obtained (observed) based on the second interference image 272 (see FIG. 13) is a direction that bisects an angle formed by the laser illuminator 2 and the second light path 222 (reflecting mirror 241) with respect to the inspection target 8.

The controller 5 is configured to acquire a composite image 273 (see FIG. 14) by combining the first interference image 271 (see FIG. 12) representing a vibration state as viewed in a direction orthogonal to the surface 80 of the inspection target 8 in the frontward direction toward the measurer 3 and the second interference image 272 (see FIG. 13) representing a vibration state as viewed in the direction inclined with respect to the surface 80 of the inspection target 8 in a measurement area of the inspection target 8. As discussed above, because the first interference image 271 and the second interference image 272 are captured to acquire displacement in different directions, the first and the second interference images have different aspect ratios. For this reason, the controller 5 is configured to correct distortion of at least the second interference image 272 (image correction processing) before combining the first interference image 271 and the second interference image 272 or before comparison between the first interference image 271 and the second interference image 272. The distortion correction (image correction processing) applied to the first interference image 271 and the second interference image 272 is similar to the processing described in the first embodiment. The images before correction (first interference image 271 and second interference image 272), corrected images, and the composite image 73 are stored (saved) similar to the first embodiment.

The other configuration of the second embodiment is similar to the first embodiment.

Advantages of Second Embodiment

In the second embodiment, the following advantages are obtained.

In the defect inspection apparatus 200 and a defect inspection method according to the second embodiment, similar to the first embodiment, it is possible to easily determine whether any crack having any depth (relatively deep crack, relatively shallow crack, etc.) is included in an inspection target without changing an angle of the inspection target 8 with respect to the measurer 3.

In addition, following additional advantages can be obtained by the defect inspection apparatus 200 according to the second embodiment added with configurations discussed below.

In the defect inspection apparatus 200 according to the second embodiment, as discussed above, the measurer 3 is configured to switch interference light of the laser light to be received in a common area (light-receiving area 230) of the light-receiving area of the image sensor 236 (image capturer) between interference light of the laser light that passes through the first light path 221 in which the reflected laser light travels from the common surface (surface 80) of the inspection target 8 and interference light of the laser light that passes through the second light path 222 in which the reflected laser light travels from the common surface of the inspection target whereby acquiring the first interference image 271 and the second interference image 272. Accordingly, because the measurer 3 separately acquires the first interference image 271 and the second interference image 272 by changing interference light of laser light to be received in a common area (light-receiving area 230) of the light-receiving area of the image sensor 236, interference light of the laser light that passes through the first light path 221 and interference light of the laser light that passes through the second light path 222 can be acquired without dividing the light-receiving area 230 of the image sensor 236 into a plurality of areas. As a result, as compared with a case in which interference light of the laser light that passes through the first light path 221 and interference light of the laser light that passes through the second light path 222 are simultaneously received by dividing the light-receiving area 230 of the image sensor 236 into a plurality of areas, because interference light of the laser light that passes through the first light path 221 and interference light of the laser light that passes through the second light path 222 can be acquired in a wider area (light-receiving area), each of the first interference image 271 and the second interference image 272 can be acquired in a wider measurement area.

The other advantages of the second embodiment are similar to the first embodiment.

Third Embodiment

A defect inspection apparatus 300 according to a third embodiment embodiment is now described with reference to FIGS. 15 to 20. The same configurations in the Figures as those of the first and second embodiments are denoted by the same reference numerals.

Figure 15:
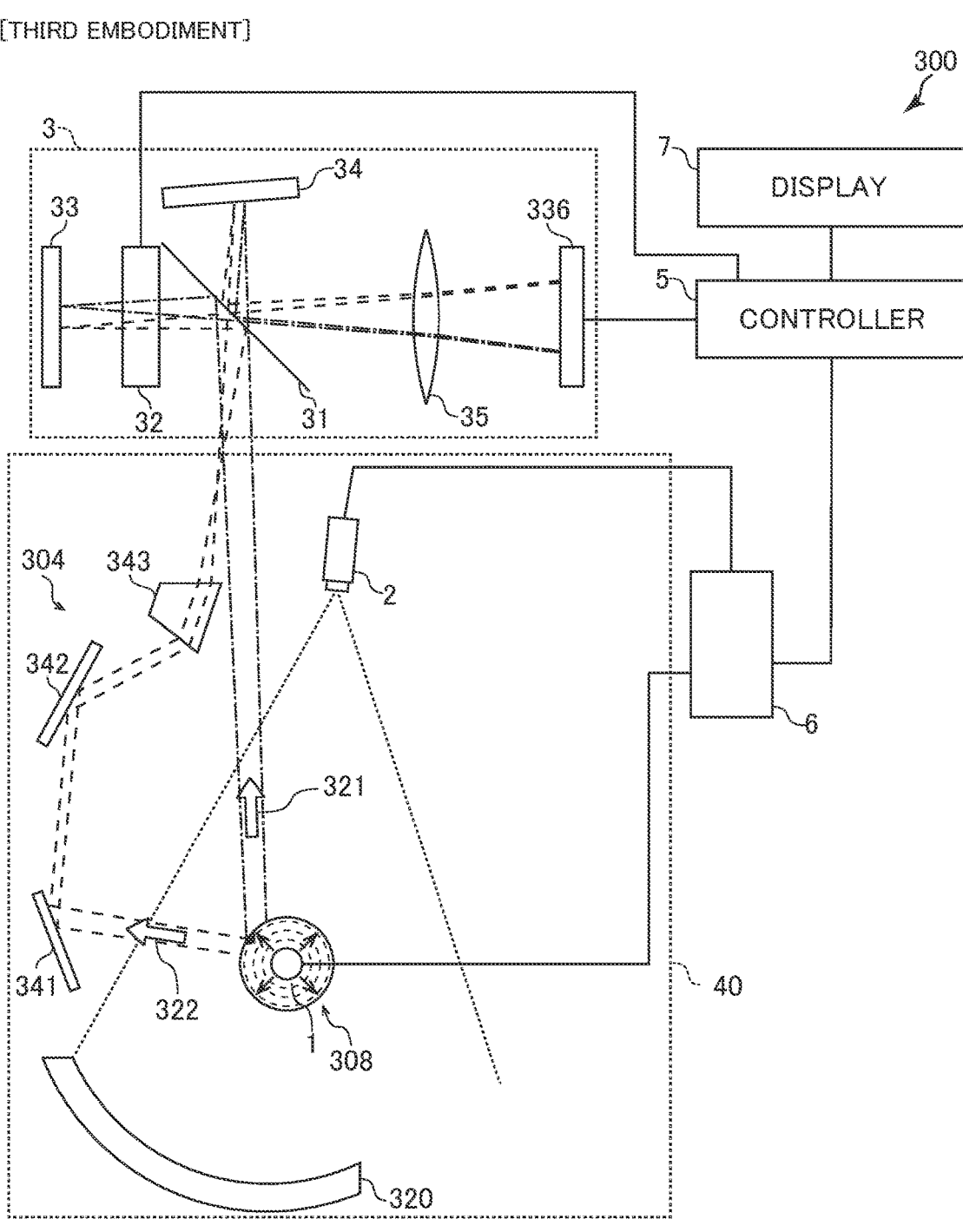
FIG. 15 is a schematic diagram entirely showing a configuration of a defect inspection apparatus according to a third embodiment of the present invention.
Figure 16:
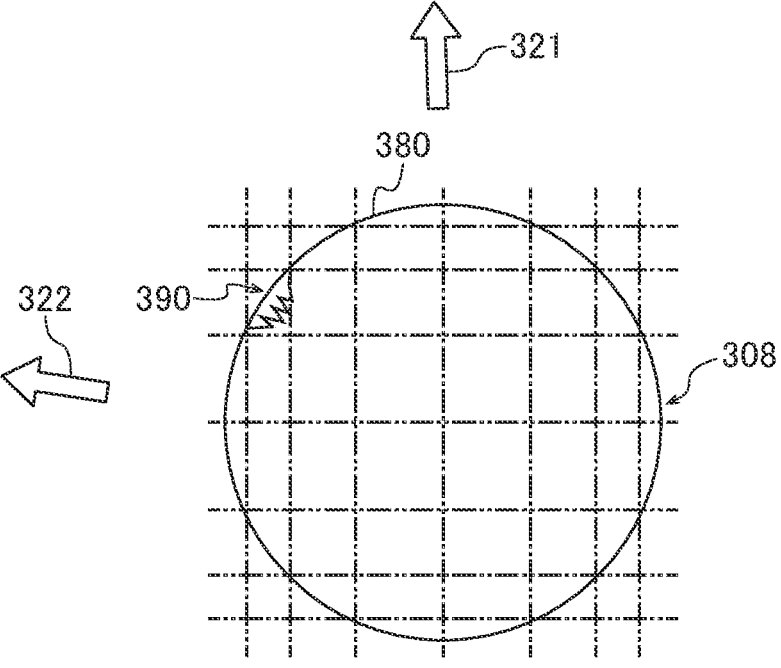
FIG. 16 is a schematic diagram showing first and second light paths in which the reflected laser light travels from an inspection target in the defect inspection apparatus according to the third embodiment of the present invention.

Dissimilar to the first embodiment in which the inspection target 8 is a plate-shaped member, an inspection target 308 in the third embodiment has a curved surface 380 as shown in FIGS. 15 and 16. The inspection target 308 can be, for example, an object having a cylindrical or columnar shape. The defect inspection apparatus 300 is configured to acquire an interference image 370 (see FIG. 20) representing a vibration state of the inspection target 308, which will be described later, and is configured to determine whether a defect 390 (see FIG. 16) of the inspection target 308 is included. Optical axes of 2 routes on a first light path 321 side are shown by alternate long and short dash lines, and optical axes of 2 routes on a second light path 322 side are shown by dashed lines in FIG. 15.

The defect inspection apparatus 300 further includes a reflecting mirror 320 that is configured to reflect laser light that is emitted by the laser illuminator 2 as shown in FIG. 15. The inspection target 308 is interposed between the laser illuminator 2 and the reflecting mirror 320. The reflecting mirror 320 reflects the laser light that is emitted by the laser illuminator 2 so that the laser light that is emitted by the laser illuminator 2 can reach not only a side (front surface side) of the inspection target 308 that faces the laser illuminator 2 but also a side (back surface side of the inspection target 308) opposite to the laser illuminator 2.

The defect inspection apparatus according to the third embodiment includes an optical system 304 including a reflecting mirror 341, a reflecting mirror 342, and a lens 343. The optical system 304 is arranged at a position other than the first light path 321, and is configured to guide toward the measurer 3 the laser light that is reflected by a measurement area of the inspection target 308, which has the curved surface 380, different from a measurement area of the inspection target 308 by which the laser light is reflected toward the first light path 321 leading to the measurer 3, and then passes through the second light path 322.

Specifically, the optical system 304 is configured to reflect laser light that is reflected by a measurement area of the inspection target 308 different from a measurement area of the inspection target 308 by which laser light is reflected toward the first light path 321 and travels on the second light path 322 by the reflecting mirror 341, and then by the reflecting mirror 342. The optical system 304 is configured to refract the laser light that is reflected by the reflecting mirror 342 and passes through the second light path 322 by using the lens 343 so that the laser light enters the measurer 3 whereby directing the laser light that passes through the second light path 322 in which the reflected laser light travels in a direction different from the first light path 321 toward the measurer 3.

The measurer 3 is configured to acquire interference images 370 representing vibration states in a plurality of measurement areas of the inspection target 308. Specifically, the measurer 3 is configured to acquire the interference images 370 (see FIG. 20) representing a vibration state in a front-surface-side area that faces the measurer 3 and reflects the laser light toward the first light path 321, and in a side-surface-side area that reflects the laser light toward the second light path 322.

Figure 17:
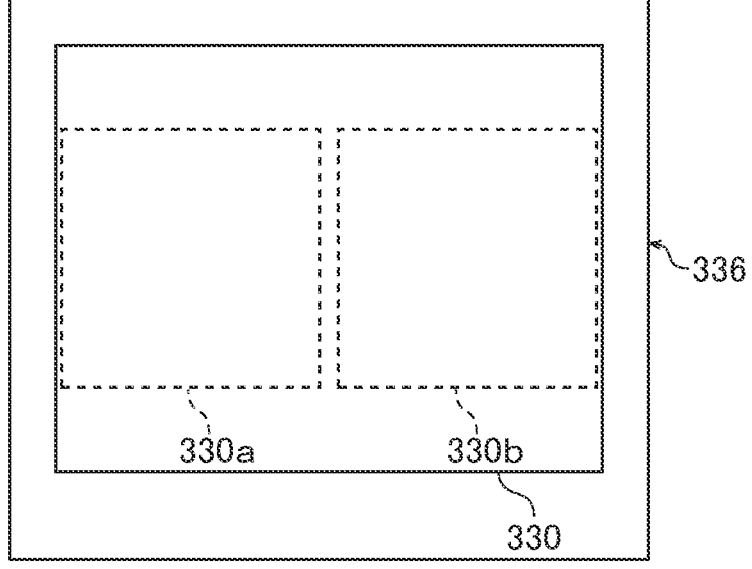
FIG. 17 is a view showing a light-receiving area of an image sensor in the third embodiment.

The measurer 3 is configured to receive interference light of the laser light that passes through the first light path 321 in which the reflected laser light travels from one measurement area of the inspection target 308 and interference light of the laser light that passes through the second light path 322 in which the reflected laser light travels from another measurement area of the inspection target 308 in a plurality of areas (area 330a and area 330b) of the light-receiving area 330 of the image sensor 336 that are defined by dividing the light-receiving area into the plurality of areas corresponding to the interference light of the laser light that passes through the first light path 321 and the interference light of the laser light that passes through the second light path 322 as shown in FIG. 17. Accordingly, the measurer 3 is configured to simultaneously acquire interference images 371 and 372 representing vibration states in the one and another measurement areas, which are different from each other, of the inspection target 308, which has the curved surface 380. In other words, the defect inspection apparatus 300 is configured to simultaneously acquire interference images 371 and 372 corresponding to interference light of laser light that is reflected in one of a plurality of directions (two directions)

from the inspection target 308, and light of laser light that is reflected from another direction from the inspection target 308.

Figure 18:
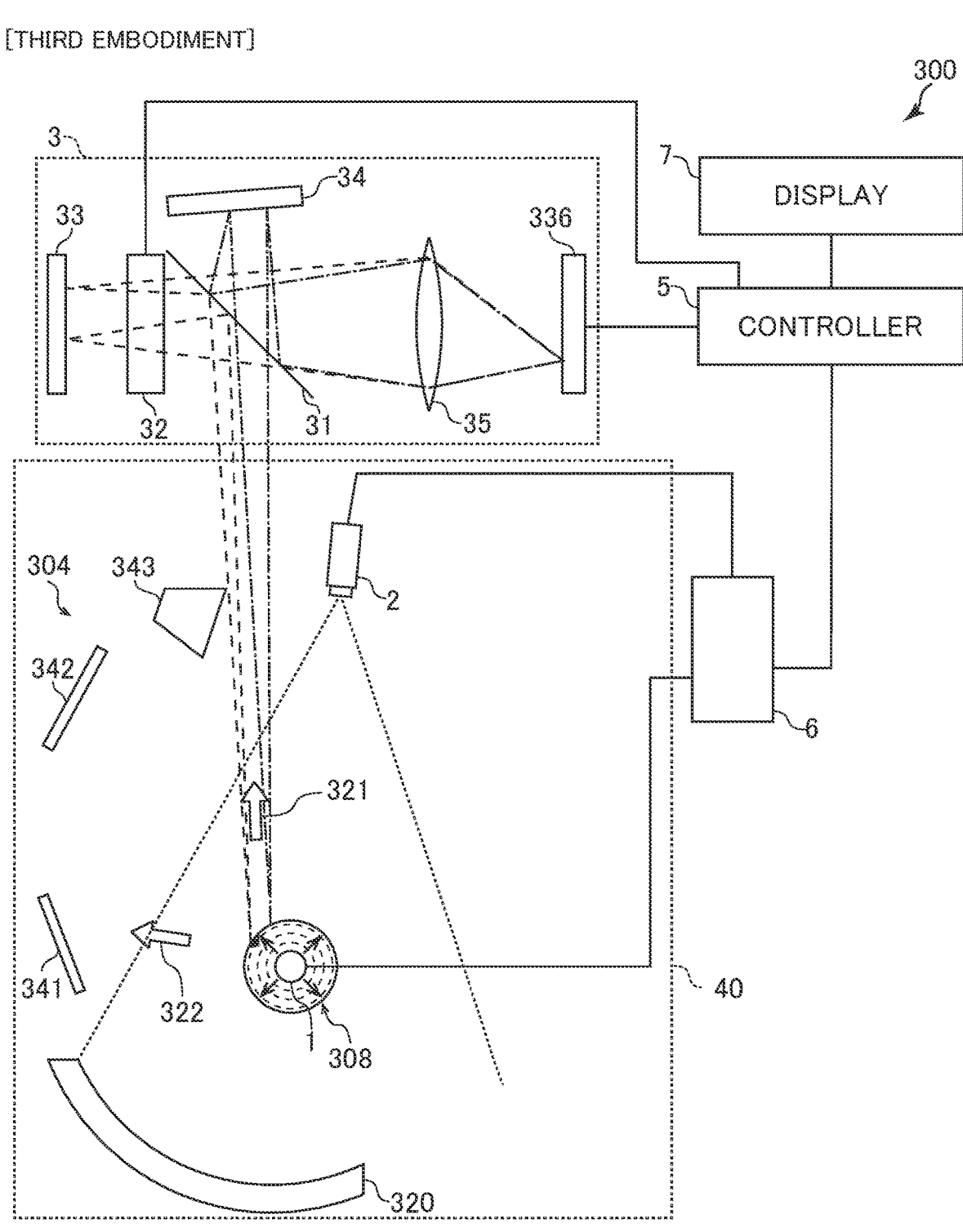
FIG. 18 is a diagram illustrating exemplary convergence and divergence of light that is reflected in a direction extending along the first light path in the third embodiment in relation to image capture based on the light.

The image sensor 336 includes a light-receiving area 330 (area 330*a* and area 330*b*) for receiving interference light of the laser light that results from interference by the measurer 3 as shown in FIG. 17. The measurer 3 is configured to receive interference light of the laser light that passes through the first light path 321 in which the reflected laser light travels from the inspection target 308 in a direction in which the inspection target 308 faces the measurer 3 (see FIG. 18) in the area 330*a* (see FIG. 17) of the light-receiving area 330 in the image sensor 336 whereby acquiring the interference image 371. FIG. 18 is a diagram illustrating exemplary convergence and divergence of light that is reflected in a direction extending along the first light path 321 in relation to image capture based on the light.

Figure 19:
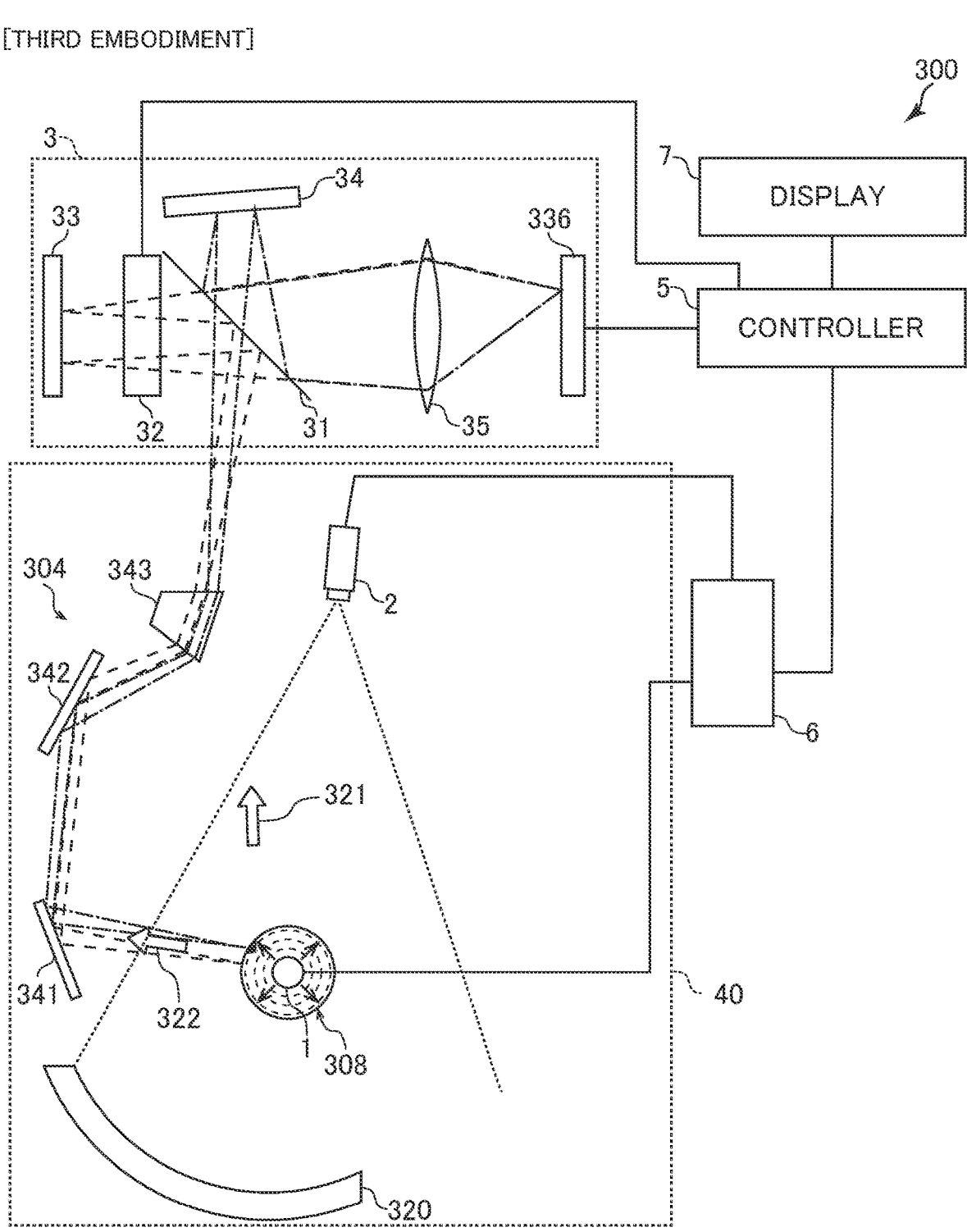
FIG. 19 is a diagram illustrating exemplary convergence and divergence of light that is reflected in a direction extending along the second light path in the third embodiment in relation to image capture based on the light.

The measurer 3 is configured to receive interference light of the laser light that passes through the second light path 322 in which the reflected laser light travels from the inspection target 308 in a direction orthogonal to the direction in which the inspection target 308 faces the measurer 3 (see FIG. 19) in the area 330*b* (see FIG. 17) of the light-receiving area 330 in the image sensor 336 whereby acquiring the interference image 372. FIG. 19 is a diagram illustrating exemplary convergence and divergence of light that is reflected in a direction extending along the second light path 322 in relation to image capture based on the light.

In the third embodiment, the controller 5 is configured to correct a length of the inspection target 308 at least in a direction extending along the curved surface 380 in the acquired interference image 370 representing a vibration state of the inspection target 308 based on a curvature of the curved surface 380 of the inspection target 308.

In the third embodiment, the controller 5 is configured to continuously couple the interference images 370, which are acquired in the plurality of measurement areas to represent vibration states, in a direction extending along the curved surface 380 of the inspection target 308.

Specifically, the controller 5 is configured to correct a length of the inspection target 308 at least in a direction extending along the curved surface 380 in the interference images 371 and 372 based on a curvature of the curved surface 380 of the inspection target 308 in a measurement area that is previously acquired (image correction). At the same time, the controller 5 removes part other than the interference images 371 and 372, and an overlap part between the interference images 371 and 372 from the interference images 370. The remaining parts of the interference images 371 and 372 are then coupled to each other. In an image captured by the image sensor 336, a part of an object whose imaging distance is shorter becomes larger while a part of the object whose imaging distance is longer becomes smaller in a captured image of the object. To address this, the controller 5 may correct the image in accordance with the imaging distance (distance to the curved surface 380 of the inspection target 308) in addition to the correction of the length along the curved surface 380. As a result, because distortion caused by the imaging distance difference can be corrected, even if an object has a curved surface (curved surface 380) shown as the inspection target 308, images can be easily coupled. In addition, because the correction in accordance with the imaging distance improves legibility of the image of the curved surface 380 of the inspection target 308, users can more easily determine whether a defect (defect 390) is included.

Figure 20:
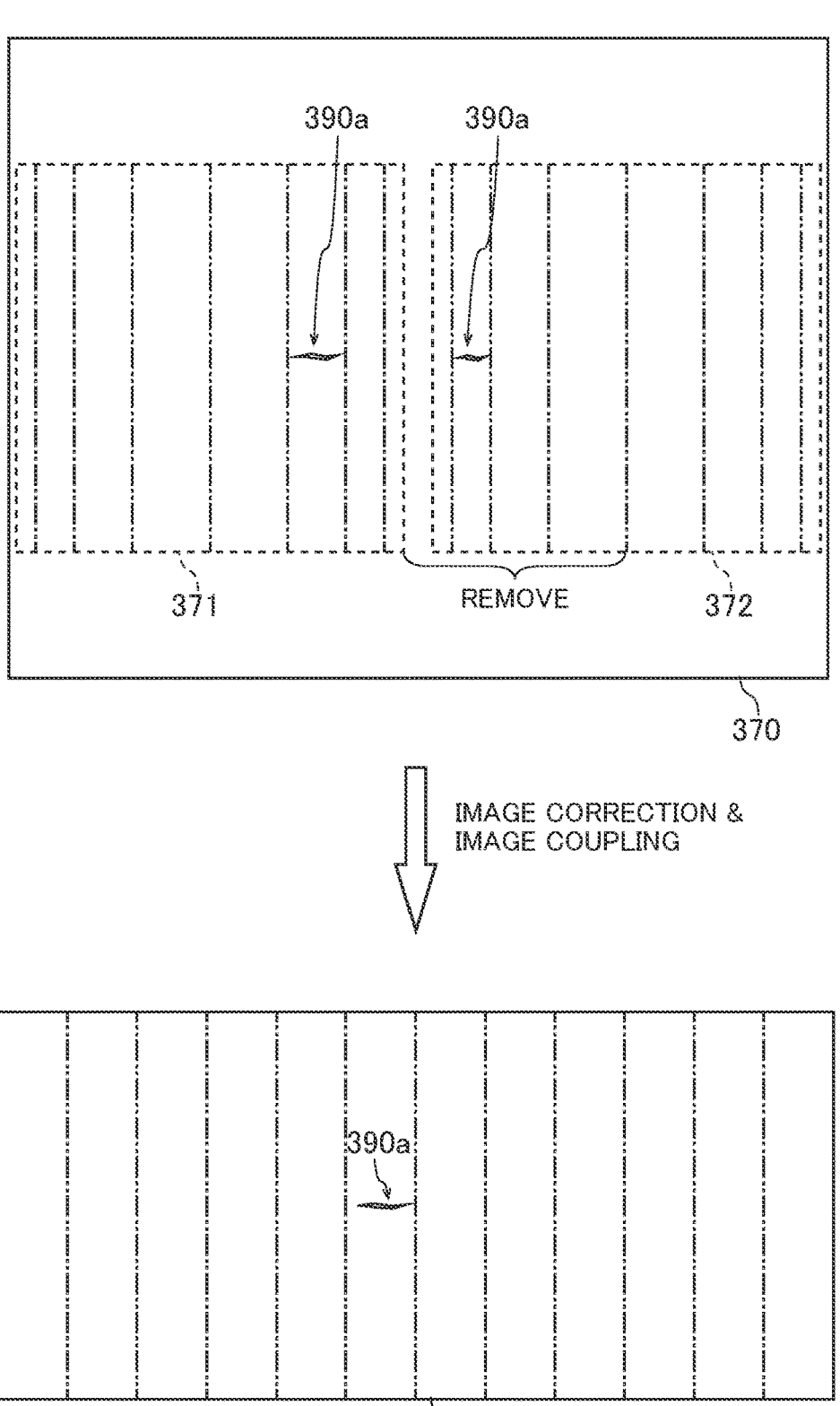
FIG. 20 is a view showing exemplary image correction processing and image connection processing applied to interference images in the third embodiment.

As shown in FIG. 20, the controller 5 can generate a coupled image 373 by applying image correction and image coupling to the interference images 370 (interference images 371 and 372).

Also, the defect inspection apparatus 300 is configured to acquire displacement 390*a* (see FIG. 20) in a vibration state caused by the defect 390 of the inspection target 308 from interference images 370 (interference images 371 and 372). The defect inspection apparatus 300 can determine whether a defect (defect 390) of the inspection target 308 is included based on the displacement 390*a* in the acquired vibration state similar to the first embodiment.

The other configuration of the third embodiment is similar to the first embodiment.

Advantages of Third Embodiment

In the third embodiment, the following advantages are obtained.

The third embodiment is intended to solve the problem that, in a case in which an inspection target has the curved surface, it is difficult to easily provide a wider measurement area of the inspection target in which it is determine whether any crack is included without changing positions of the inspection target and the measurer. In the defect inspection apparatus 300 and a defect inspection method according to the third embodiment, because an interference image 371 representing a vibration state of the inspection target 308 as viewed in a direction extending along the first light path 321, and an interference image 372 representing a vibration state of the inspection target 308 as viewed in a direction extending along the second light path 322 can be acquired, it is possible to acquire interference images (interference images 371 and 372) representing vibration states in two different directions. As a result, because interference images (interference images 371 and 372) representing vibration states of the inspection target 308 having the curved surface 380 in a plurality of directions, dissimilar to a case in which an interference image representing a vibration state of the inspection target 308 having the curved surface 380 only in one direction, it is possible to easily provide a wider measurement area of the inspection target in which it is determine whether a defect (defect 390) is included without changing positions of the inspection target 308 and the measurer 3. Therefore, it is possible to easily provide a wider measurement area of an inspection target 308 in which it is determine whether a defect (defect 390) is included without changing positions of the inspection target 308 and the measurer 3 in a case in which the inspection target 308 has the curved surface 380.

In addition, following additional advantages can be obtained by the defect inspection apparatus 300 according to the third embodiment added with configurations discussed below.

In the defect inspection apparatus 300 according to the third embodiment, as discussed above, the measurer 3 is configured to receive interference light of the laser light that passes through the first light path 321 and interference light of the laser light that passes through the second light path 322 in the areas 330*a* and 330*b* whereby simultaneously acquiring interference images 370 (interference images 371 and 372) representing vibration states of the different measurement areas of the inspection target 308, which has the curved surface 380. Accordingly, because the interference image 371 based on interference light of the laser light that passes through the first light path 221, and the interference image 372 based on interference light of the laser light that passes through the second light path 322 can be simultaneously acquired, it is possible to reduce inspection time required to determine whether any defect (defect 390) is included in the inspection target 308.

In the defect inspection apparatus 300 according to the third embodiment, as discussed above, the controller 5 is configured to correct a length of the inspection target 308 at least in a direction extending along the curved surface 380 in the acquired interference image 370 (interference images 371 and 372) representing a vibration state of the inspection target 308 based on a curvature of the curved surface 380 of the inspection target 308. Accordingly, because legibility of the image of the curved surface 380 of the inspection target 308 is improved, users can more easily determine whether a defect (defect 390) is included.

In the defect inspection apparatus 300 according to the third embodiment, as discussed above, the controller 5 is configured to continuously couple the interference images 370 (interference images 371 and 372), which are acquired in the plurality of measurement areas to represent the vibration states, in a direction extending along the curved surface 380 of the inspection target 308. Accordingly, users can visually collectively recognize the interference images 371 and 372 representing vibration states of the inspection target 308 in a plurality of measurement areas.

Fourth Embodiment

A defect inspection apparatus 400 according to a fourth embodiment embodiment is now described with reference to FIGS. 21 to 24. The same configurations in the Figures as those of the first to third embodiments are denoted by the same reference numerals.

The defect inspection apparatus 400 is configured to acquire interference images representing vibration states based on interference light of laser light that is reflected in four directions (4 directions) from the inspection target 308.

Figure 21:
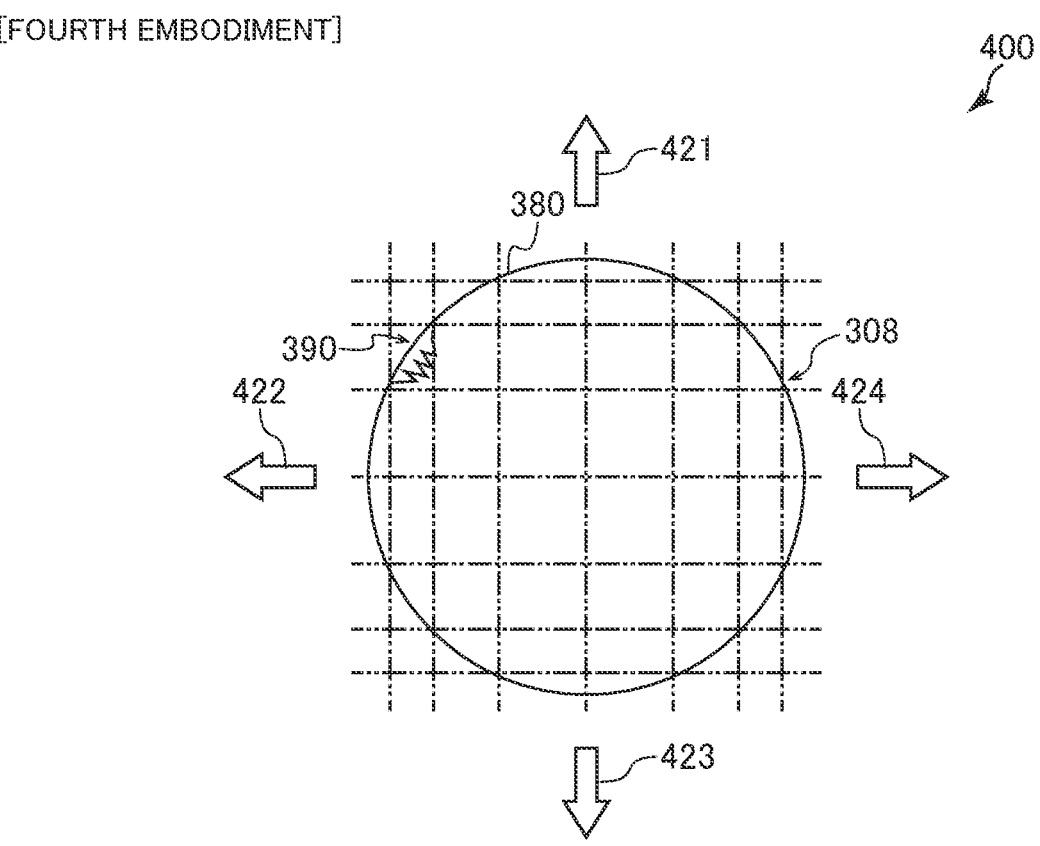
FIG. 21 is a schematic diagram showing first, second, third and fourth light paths in which the reflected laser light travels from an inspection target in the defect inspection apparatus according to a fourth embodiment of the present invention.

The measurer 3 of the defect inspection apparatus 400 is configured to acquire the interference image 470 based on interference light of the laser light that passes through the first light path 421 in which the reflected laser light travels from the inspection target 308 shown in FIG. 21. In the first light path 421, the reflected laser light directly travels toward the measurer 3 from the inspection target 308. Also, the defect inspection apparatus 400 is configured to guide the laser light that passes through the second light path 422, the laser light that passes through the third light path 423, and the laser light that passes through the fourth light path 424 toward the measurer 3 by using optical systems such as the reflecting mirrors or the lens as shown in the third embodiment corresponding to the laser light that passes through the second light path 422, the laser light that passes through the third light path 423, and the laser light that passes through the fourth light path 424.

Figure 22:
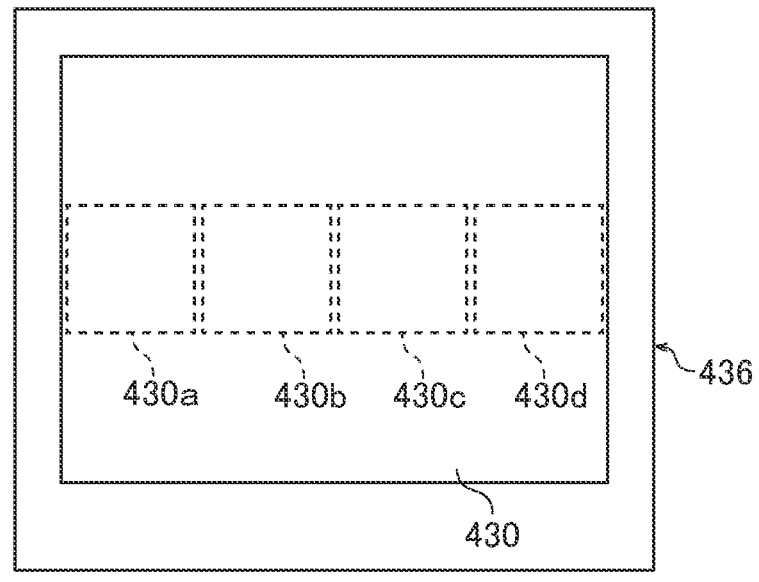
FIG. 22 is a view showing a light-receiving area of an image sensor in the fourth embodiment.
Figure 23:
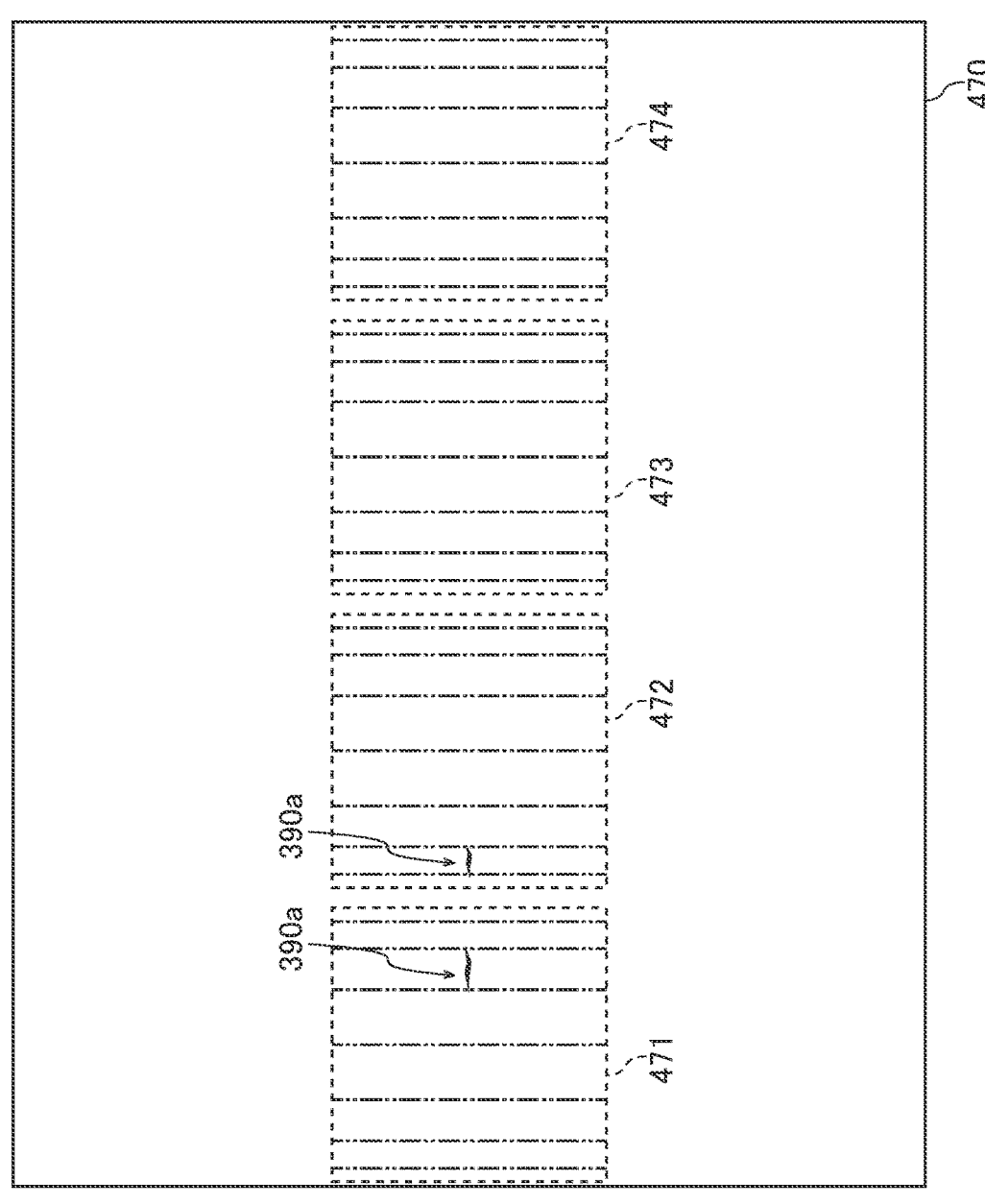
FIG. 23 is a view showing an exemplary interference image in the fourth embodiment.

As shown in FIG. 22, an image sensor 436 of the defect inspection apparatus 400 has a light-receiving area 430, and the light-receiving area 430 includes four areas (areas 430a, 430b, 430c and 430d).

The image sensor 436 receives the interference light of the laser light that passes through the first light path 421, the interference light of the laser light that passes through the second light path 422, the interference light of the laser light that passes through the third light path 423, and the interference light of the laser light that passes through the fourth light path 424 in the areas 430a, 430b, 430c and 430d, respectively. As a result, the measurer 3 of the defect inspection apparatus 400 can acquire the interference images

470 (see FIG. 23) of the inspection target 308 representing vibration states of the inspection target 308 as viewed in the four directions.

The interference images 470 acquired based on the received interference light in the light-receiving area 430 of the image sensor 436 include interference images 471, 472, 473 and 474. The interference image 471 is acquired based on the interference light of the laser light that passes through the first light path 421 and is received in the area 430a. The interference image 472 is acquired based on the interference light of the laser light that passes through the second light path 422 and is received in the area 430b. The interference image 473 is acquired based on the interference light of the laser light that passes through the third light path 423 and is received in the area 430c. The interference image 474 is acquired based on the interference light of the laser light that passes through the fourth light path 424 and is received in the area 430d.

Figure 24:
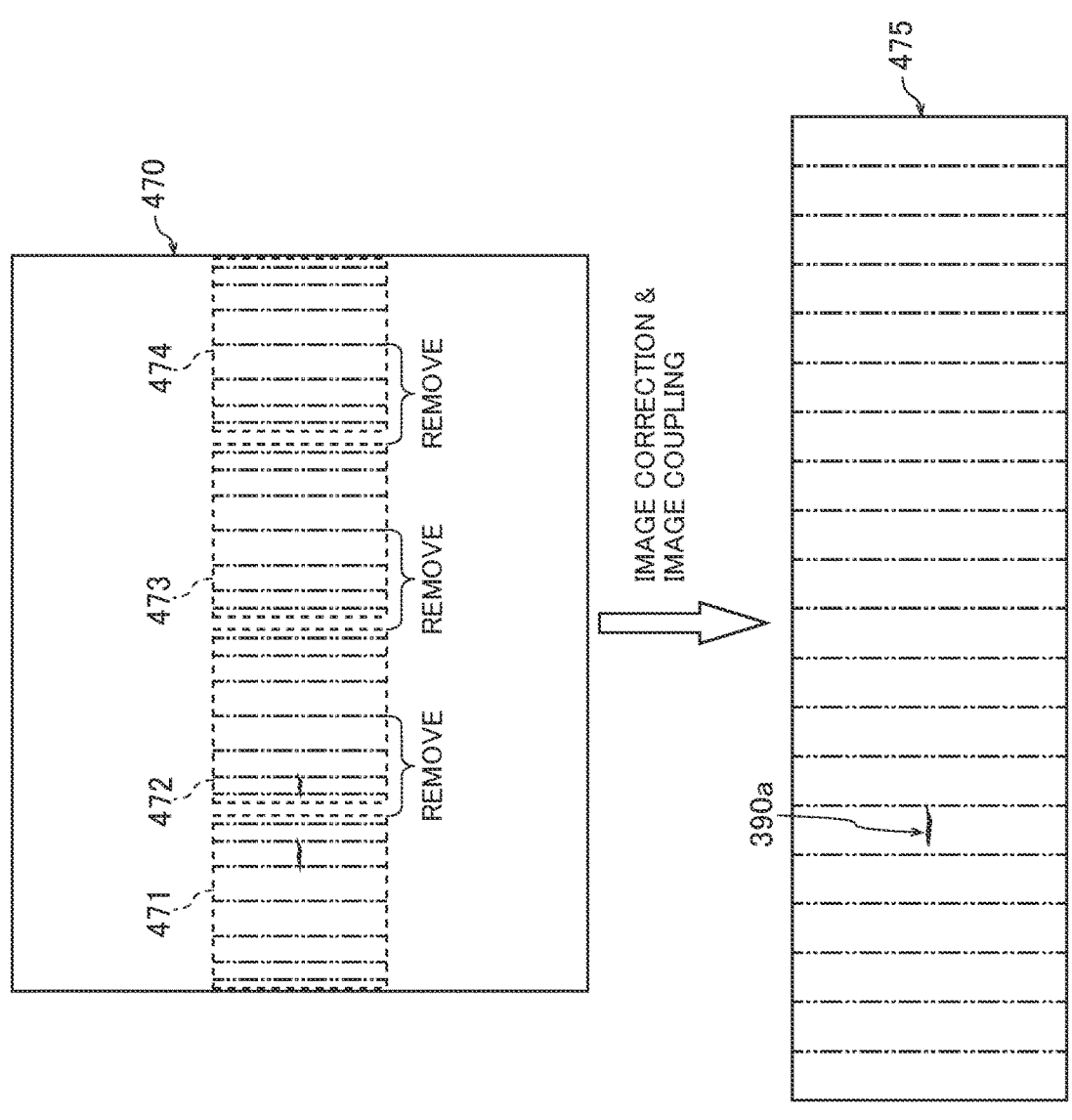
FIG. 24 is a view showing exemplary image correction processing and image connection processing applied to interference images in the fourth embodiment.

As shown in FIG. 24, in the fourth embodiment, the controller 5 can generate a developed image 475 by applying image correction and image coupling to the interference images 470 (interference images 471, 472, 473 and 474) similar to the foregoing fourth embodiment.

Specifically, the controller 5 is configured to correct a length of the inspection target 308 at least in a direction extending along the curved surface 380 in the interference images 471, 472, 473 and 474 based on a curvature of the curved surface 380 of the inspection target 308 in a measurement area that previously acquired (image correction). At the same time, the controller 5 removes part other than the interference images 471, 472, 473 and 474, and an overlap part between the interference images 471, 472, 473 and 474 from the interference images 470. The remaining parts of the interference images 471, 472, 473 and 474 are then coupled to each other.

The other configuration and advantages of the fourth embodiment are similar to the foregoing third embodiment.

Fifth Embodiment

Figure 25:
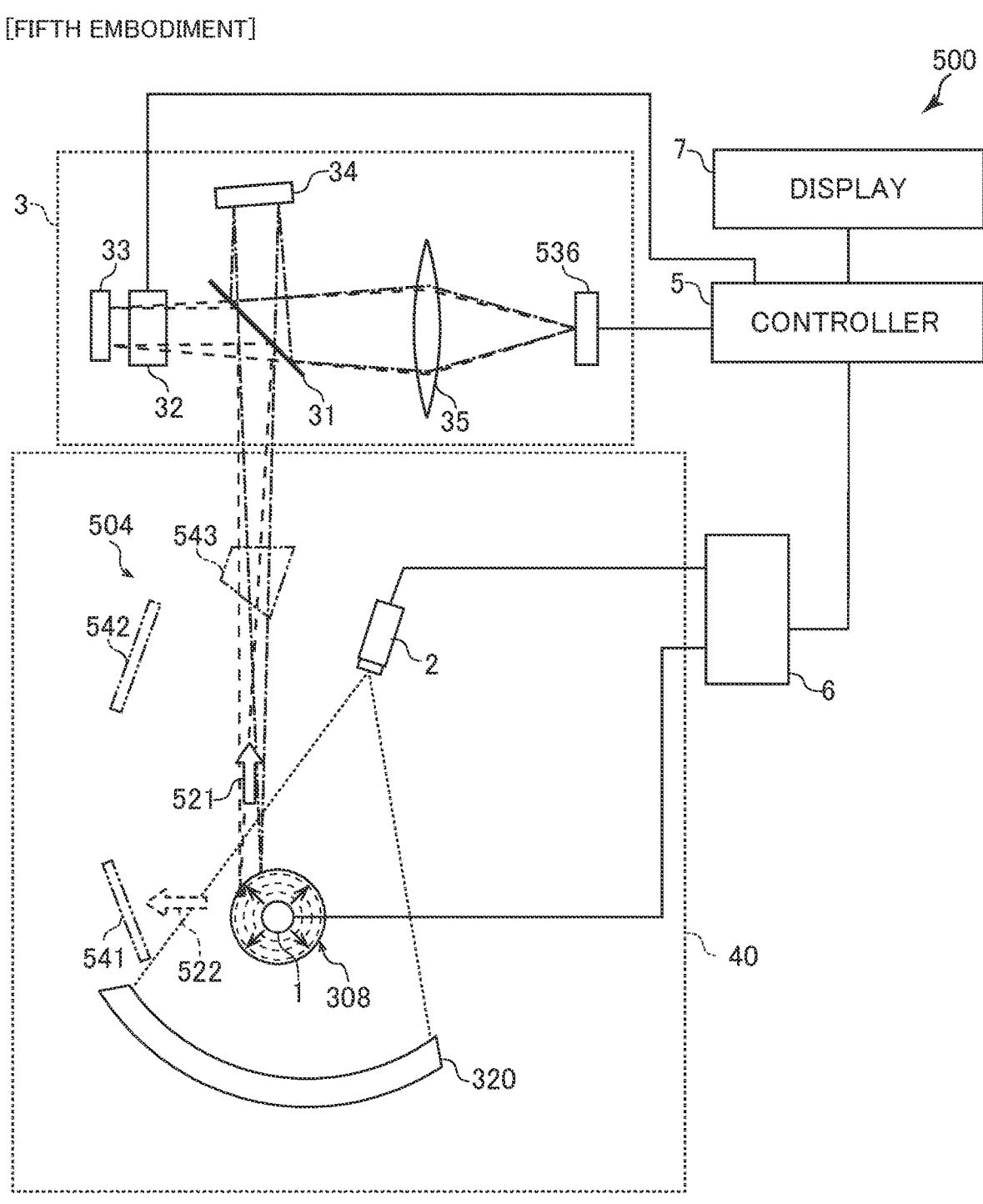
FIG. 25 is a first schematic diagram entirely showing a configuration of a defect inspection apparatus according to a fifth embodiment of the present invention, and is a diagram illustrating exemplary convergence and divergence of light that is reflected in a direction extending along a first light path in relation to image capture based on the light.
Figure 26:
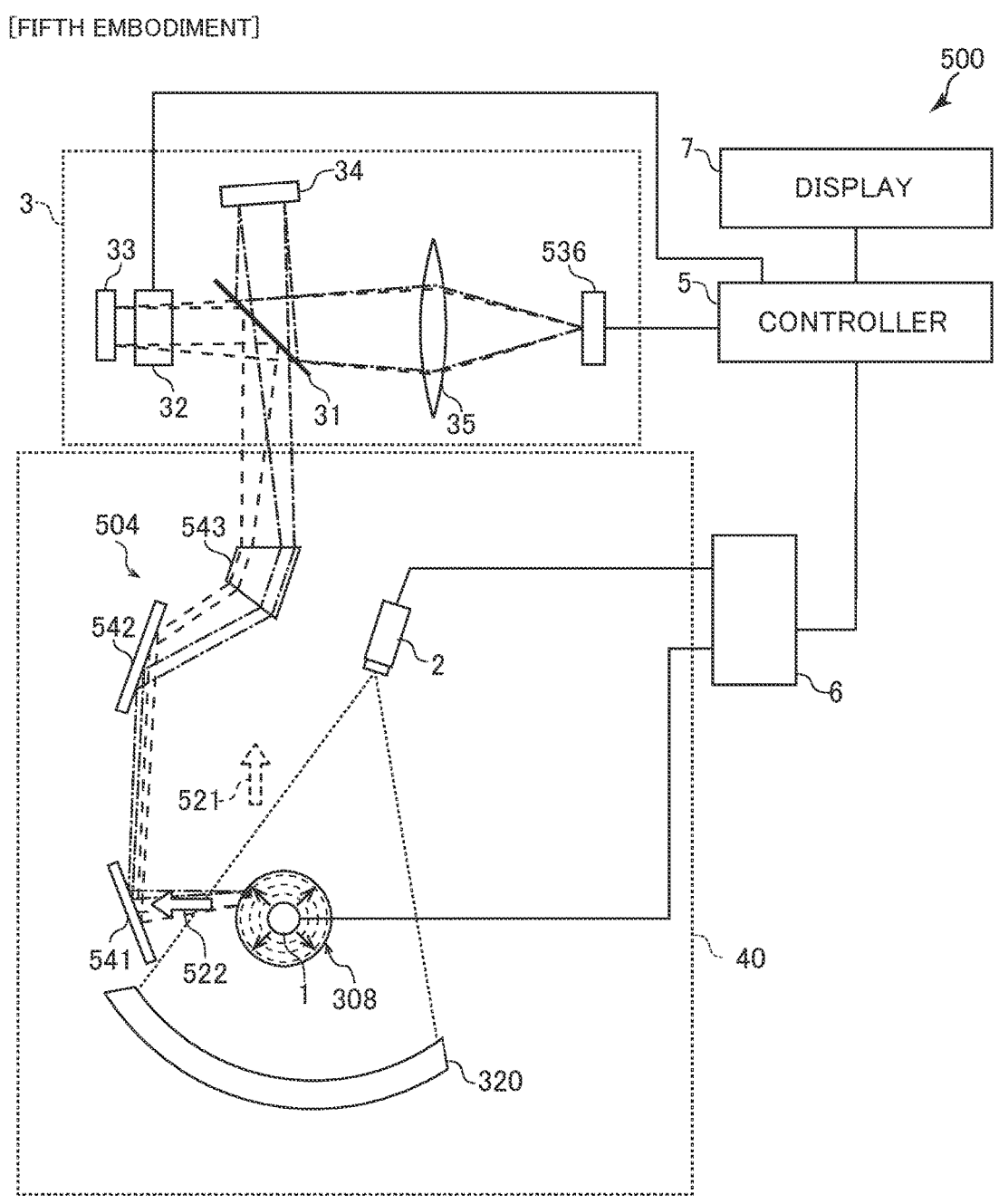
FIG. 26 is a second schematic diagram entirely showing a configuration of a defect inspection apparatus according to the fifth embodiment of the present invention, and is a diagram illustrating exemplary convergence and divergence of light that is reflected in a direction extending along a second light path in relation to image capture based on the light.

A defect inspection apparatus 500 according to a fifth embodiment embodiment is now described with reference to FIGS. 25 to 31. The same configurations in the Figures as those of the first to fourth embodiments are denoted by the same reference numerals. FIG. 25 is a diagram illustrating exemplary convergence and divergence of light that is reflected in a direction extending along a first light path 521 in relation to image capture based on the light. FIG. 26 is a diagram illustrating exemplary convergence and divergence of light that is reflected in a direction extending along a second light path 522 in relation to image capture based on the light.

The defect inspection apparatus according to the fifth embodiment is configured to acquire interference images 571 and 572 representing vibration states of the vibration state in different measurement areas of the inspection target 308 having the curved surface 380 by changing interference light of laser light to be received dissimilar to the defect inspection apparatus according to the third embodiment, which is configured to simultaneously acquire interference images 371 and 372 representing vibration states in the one and another measurement areas, which are different from each other, of the inspection target 308, which has the curved surface 380.

The defect inspection apparatus 500 includes an optical system 504 including a reflecting mirror 541, a reflecting mirror 542 and a lens 543. The optical system 504 is configured to guide toward the measurer 3 the laser light that is reflected toward the measurer 3 by a measurement area of the inspection target 308, which has the curved surface 380, different from a measurement area of the inspection target 308 by which the laser light is reflected and travels the first light path 521, and passes through the second light path 522.

The reflecting mirror 541 overlaps the inspection target 308 as viewed in a direction orthogonal to a direction in which the inspection target 308 faces the measurer 3. The reflecting mirror 542 and the lens 543 are interposed between the measurer 3 and the inspection target 8 in the direction in which the surface 80 of the inspection target 8 faces the measurer 3 as shown in FIGS. 25 and 26. A part (lens 543) of the optical system 504 is arranged on the first light path 521.

In the defect inspection apparatus 500 according to the fifth embodiment, a position of the optical system 504 can be changed in the case 40. In the defect inspection apparatus 500, laser light that is reflected on the surface (curved surface 380) of the inspection target 308 is then incident on the measurer 3 can be changed between laser light that passes through the first light path 521 and laser light that passes through the second light path 522 by changing the position of the optical system 504.

Specifically, the defect inspection apparatus 500 can switch between an arrangement in which laser light that passes through the first light path 521 is incident on the measurer 3 (see FIG. 25), and an arrangement in which the optical system 504 (lens 543) is arranged on the first light path 521 to cut off laser light that travels on the first light path 521 while laser light that is guided by the optical system 504 and passes through the second light path 522 is incident on measurer 3 (see FIG. 26) by moving (shifting) the positions of the reflecting mirrors 541 and 542, and the lens 543 in a direction intersecting the direction in which the inspection target 8 faces the measurer 3 by using actuators (not shown). The position of the optical system 504 may be changed in accordance with control by the controller 5, or an instruction by a user. In the defect inspection apparatus 500, laser light that is incident on the measurer 3 can be changed between laser light that passes through the first light path 221 and laser light that passes through the second light path 222 by moving only the position of the lens 543.

The measurer 3 includes a common image sensor (image sensor 536) that is configured to capture images of interference light of the laser light that passes through the first light path 521 in which the reflected laser light travels from the inspection target 308 toward the measurer 3, and interference light of the laser light that passes through the second light path 522 in which the reflected laser light travels from the inspection target 308 in a direction different from the first light path 521 as shown in FIGS. 25 and 26.

Figure 27:
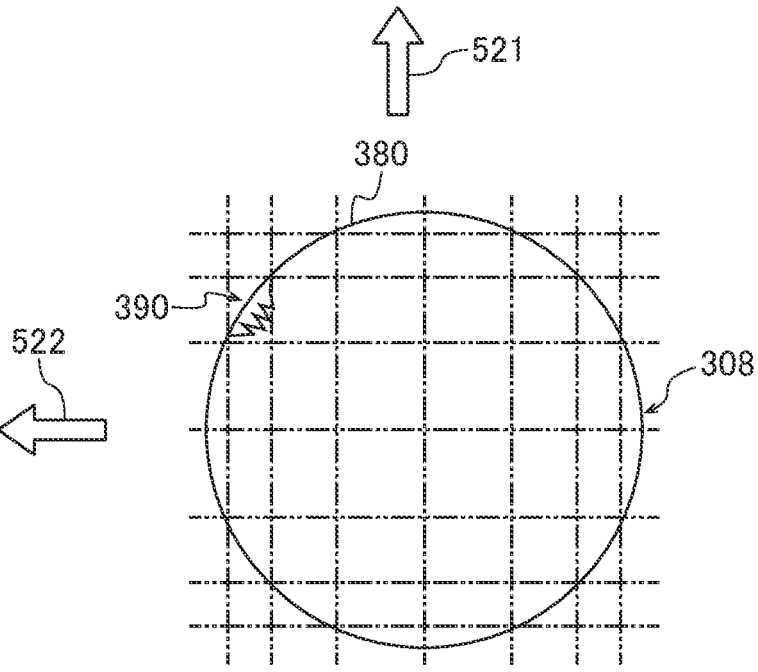
FIG. 27 is a schematic diagram showing first and second light paths in which the reflected laser light travels from an inspection target in the defect inspection apparatus according to the fifth embodiment of the present invention.

In the fifth embodiment, images of interference light of the laser light that passes through the first light path 521 in which the reflected laser light travels from the inspection target 308 shown in FIGS. 25 to 27 toward the measurer 3, and interference light of the laser light that passes through the second light path 522 in which the reflected laser light travels from the inspection target 8 in a direction different from the first light path 521 are captured by the common image sensor (image sensor 536).

Figure 28:
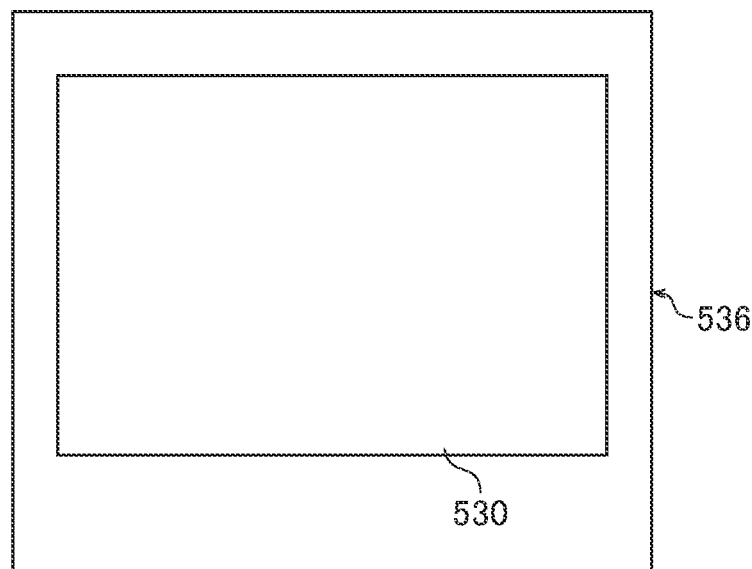
FIG. 28 is a view showing a light-receiving area of an image sensor in the fifth embodiment.
Figure 29:
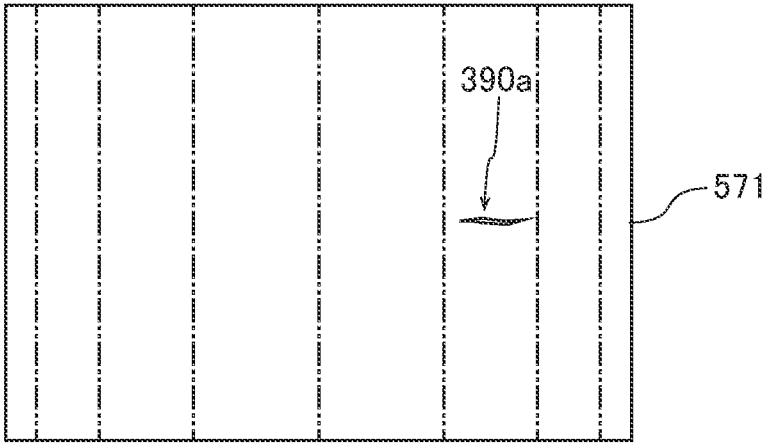
FIG. 29 is a first view showing an exemplary interference image in the fifth embodiment.
Figure 30:
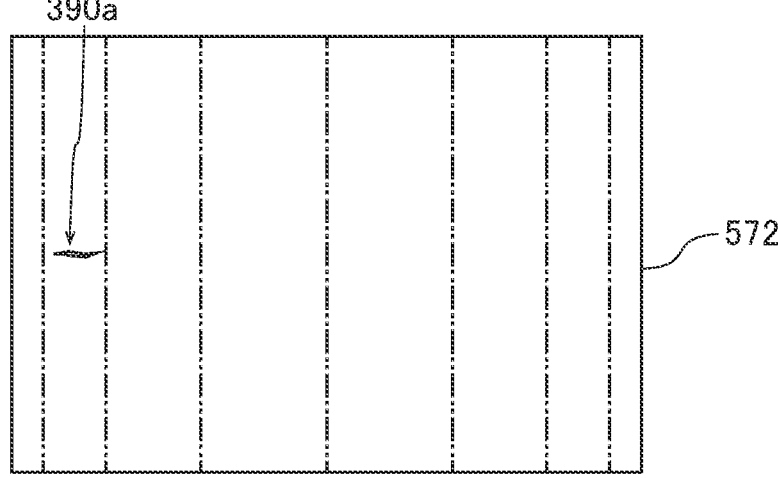
FIG. 30 is a second view showing an exemplary interference image in the fifth embodiment.

The image sensor 536 includes a light-receiving area 530 for receiving interference light of the laser light that results from interference by the measurer 3 as shown in FIG. 28.

The measurer 3 is configured to switch interference light of the laser light to be received in a common area (light-receiving area 530) of the light-receiving area of the image sensor 36 between interference light of the laser light that passes through the first light path 521 from one of the different measurement areas of the inspection target 308, which has the curved surface 380, and interference light of the laser light that passes through the second light path 522 from another of the different measurement areas whereby acquiring the interference image 571 (see FIG. 29) and the interference image 572 (see FIG. 30) representing vibration states of the different measurement areas of the inspection target 308, which has the curved surface 380.

Figure 31:
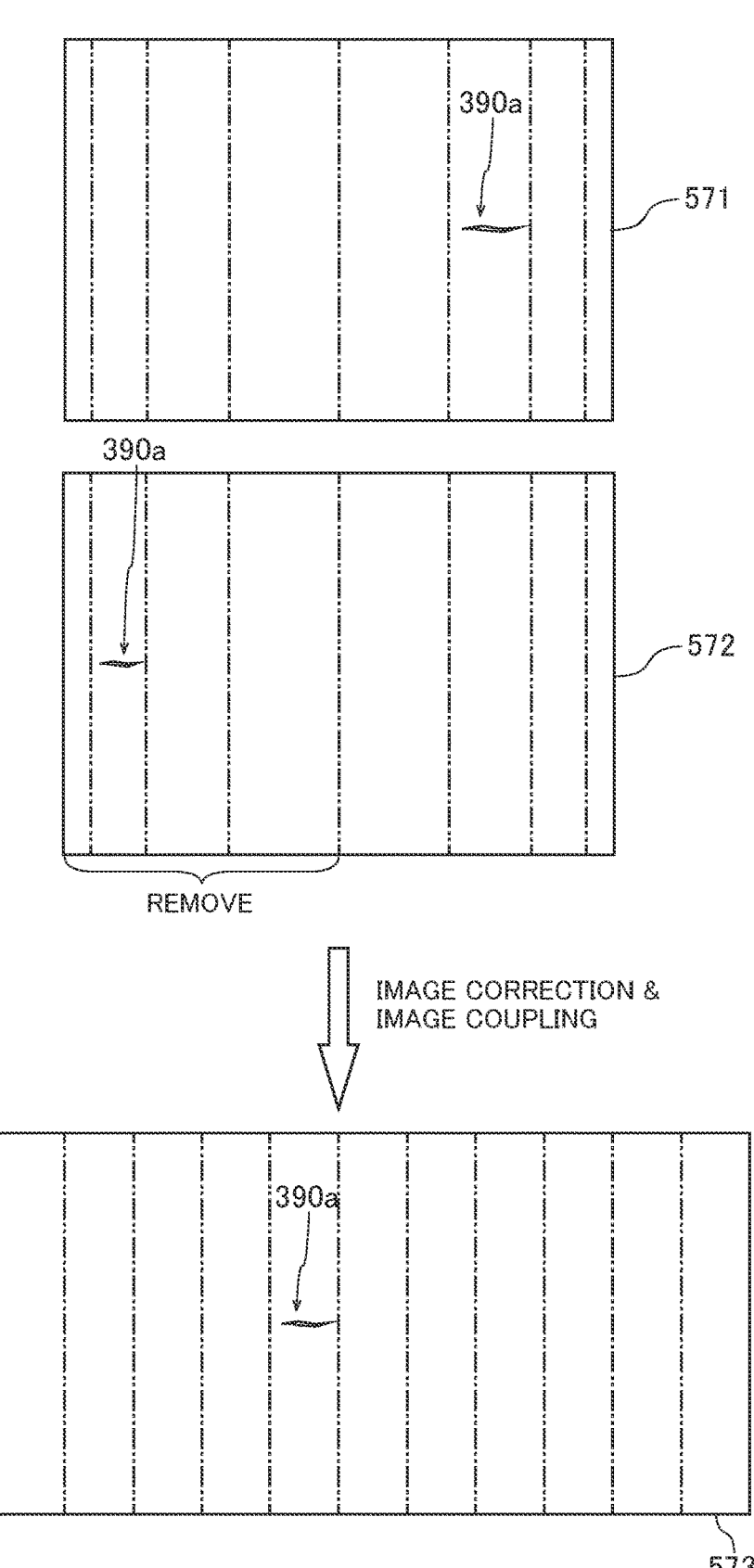
FIG. 31 is a view showing exemplary correction image processing and image connection processing applied to interference images in the fifth embodiment.

In the fifth embodiment, as shown in FIG. 31, the controller 5 can generate a developed image 573 by applying image correction and image coupling to the interference images 571 and 572.

Specifically, the controller 5 is configured to correct a length of the inspection target 308 at least in a direction extending along the curved surface 380 in the interference images 571 and 572 based on a curvature of the curved surface 380 of the inspection target 308 in a measurement area that is previously acquired (image correction). At the same time, the controller 5 removes overlap parts between the interference images 571 and 572. The remaining parts of the interference images 571 and 572 are then coupled to each other.

The other configuration of the fifth embodiment similar to the third and fourth embodiments.

Advantages of Fifth Embodiment

In the fifth embodiment, the following advantages are obtained.

In the defect inspection apparatus 500 and a defect inspection method according to the fifth embodiment, it is possible to easily provide a wider measurement area of an inspection target 308 in which it is determine whether a defect (defect 390) is included without changing positions of the inspection target 308 and the measurer 3 in a case in which the inspection target 308 has the curved surface 380.

In addition, following additional advantages can be obtained by the defect inspection apparatus 500 according to the fifth embodiment added with configurations discussed below.

In the defect inspection apparatus 500 according to the fifth embodiment, as discussed above, the measurer 3 is configured to switch interference light of the laser light to be received in a common area (light-receiving area 530) of the light-receiving area of the image sensor 536 (image capturer) between interference light of the laser light that passes through the first light path 521 and interference light of the laser light that passes through the second light path 522 whereby acquiring the interference image 571 and the interference image 572 representing vibration states of the different measurement areas of the inspection target 308, which has the curved surface 380. Accordingly, because the measurer 3 separately acquires the interference image 571 and the interference image 572 by changing interference light of laser light to be received in a common area (light-receiving area 530) of the light-receiving area of the image sensor 536, interference light of the laser light that passes through the first light path 521 and interference light of the laser light that passes through the second light path 522 can be acquired without dividing the light-receiving area 530 of the image sensor 536 into a plurality of areas. As a result, as compared with a case in which interference light of the laser light that passes through the first light path 521 and interference light of the laser light that passes through the second light path 522 are simultaneously received by dividing the light-receiving area 530 of the image sensor 536 into a plurality of areas, because interference light of the laser light that passes through the first light path 521 and interference light of the laser light that passes through the second light path 522 can be acquired in a wider area, each of the interference image 571 and the interference image 572 can be acquired in a wider measurement area.

The other advantages of the fifth embodiment are similar to the third embodiment.

Modified Embodiment

Note that the embodiment disclosed this time must be considered as illustrative in all points and not restrictive. The scope of the present invention is not shown by the above description of the embodiments but by the scope of claims for patent, and all modifications (modified examples) within the meaning and scope equivalent to the scope of claims for patent are further included.

While the example in which the laser illuminator 2 (irradiator) is arranged between the surface 80 of the inspection target 8 and the measurer 3, or between the curved surface 380 of the inspection target 308 and the measurer 3 has been shown in the aforementioned first to fifth embodiments, the present invention is not limited to this. In the present invention, the measurer and the irradiator may be arranged at substantially the same position in a direction in which the irradiator faces the surface of the inspection target. In this case, the measurer and the irradiator are positioned adjacent to each other in a direction extending along the surface of the inspection target. In other words, the measurer and the irradiator are arranged at deviated positions relative to each other in the direction extending along the surface of the inspection target.

While the example in which the optical system 4 is provided to guide laser light that travels on the second light path 22 toward the measurer 3 configured to measure interference light of laser light that passes through the first light path 21 has been shown in the aforementioned first embodiment, the present invention is not limited to this. In the present invention, measurers may be provided corresponding to laser light that passes through the first light path and laser light that passes through the second light path without the optical system.

While the example in which the image sensor 36 (image capturer) is configured to receive interference light of the laser light that passes through the first light path 21, and interference light of the laser light that passes through the second light path 22 has been shown in the aforementioned embodiments, the present invention is not limited to this. In the present invention, image capturers may be provided corresponding to interference light of the laser light that passes through the first light path, and interference light of the laser light that passes through the second light path.

While the example in which laser light that travels on the first light path 21, 221, 321 or 521 enters the measurer 3 without passing through any optical system has been shown in the aforementioned first to fifth embodiments, the present invention is not limited to this. In the present invention, laser light that travels on the first light path may pass through an optical system such as a reflecting mirror or lens, and then enter the measurer.

While the example in which the composite image 73 is acquired by combining the first interference image 71 and the second interference image 72 has been shown in the aforementioned first embodiment, and the example in which the composite image 273 is acquired by combining the first interference image 271 and the second interference image 272 has been shown in the aforementioned second embodiment, the present invention is not limited to these. In the present invention, the first interference image and the second interference image may be simply acquired without acquiring the composite image.

While the example in which the controller 5 (image processor) is configured to apply image correction and image coupling to the interference images (interference image 371, 372, 471, 472, 473, 474, 571 and 572) has been shown in the aforementioned third to fifth embodiments, the present invention is not limited to this. In the present invention, image processor may be configured to apply one of image correction and image coupling to the interference images, or to apply neither image correction nor image coupling to the interference images.

Figure 32:
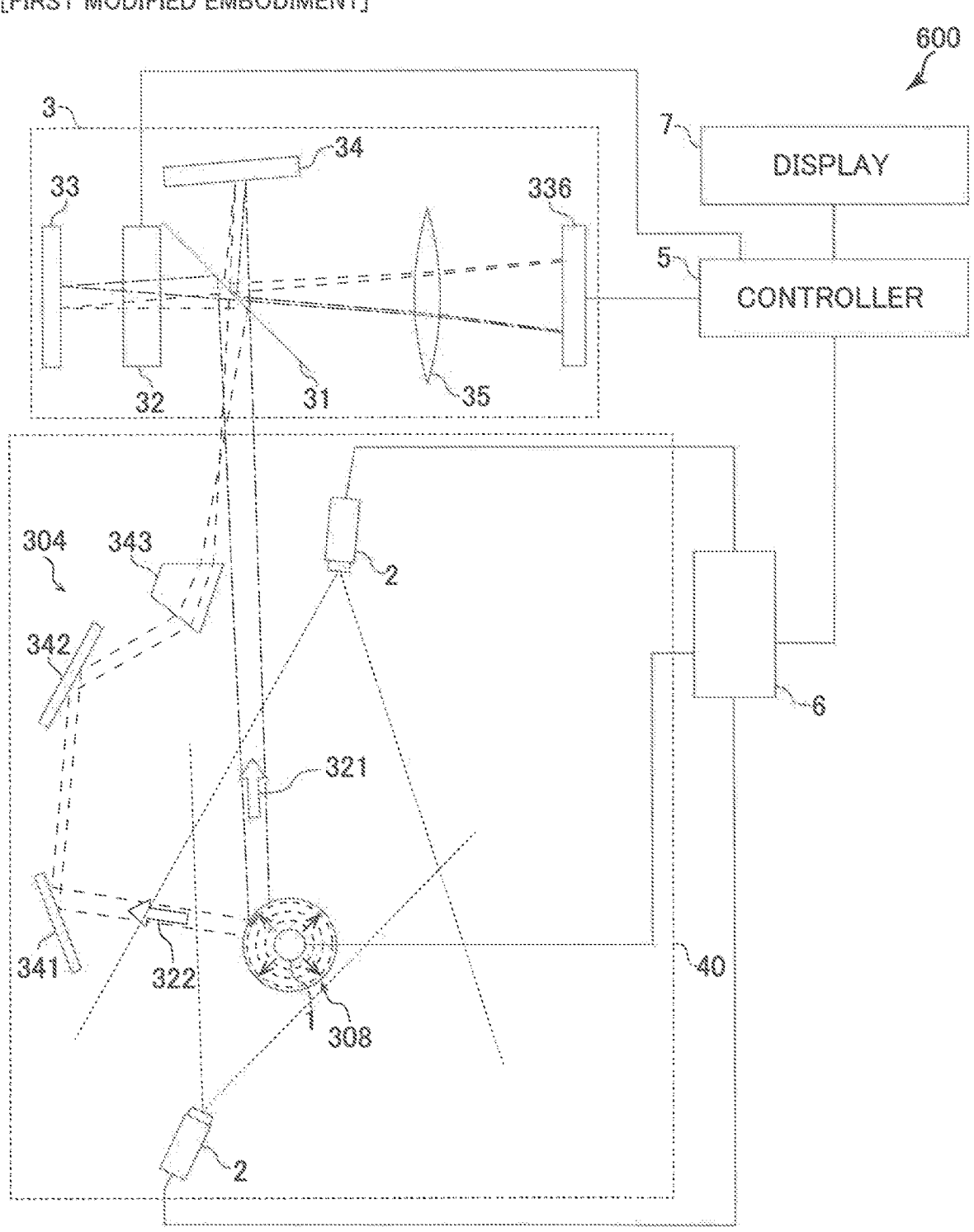
FIG. 32 is a diagram schematically entirely showing a configuration of a defect inspection apparatus according to a first modified embodiment.

While the example in which the reflecting mirror 320 is configured to reflect laser light that is emitted by the laser illuminator 2 (irradiator) has been shown in the aforementioned third to fifth embodiments, the present invention is not limited to this. In the present invention, as in a defect inspection apparatus 600 according to a first modified example shown in FIG. 32, a plurality of laser illuminators 2 may be provided to irradiate the inspection target 308 having the curved surface 380 with laser light in a plurality of directions.

While the example in which the inspection target 8 is a plate-shaped member has been shown in the aforementioned first and second embodiments, and the example in which the inspection target 308 is an object having a cylindrical or columnar shape has been shown in the aforementioned third to fifth embodiments, the present invention is not limited to these. In the present invention, the inspection target may be an object having a shape formed by combining a curved surface and a flat surface, or an object having a bowl shape.

Modes

The aforementioned exemplary embodiment will be understood as concrete examples of the following modes by those skilled in the art.

Mode Item 1

A defect inspection apparatus according to mode item including an exciter configured to impart elastic wave vibration to an inspection target to excite the elastic wave vibration in the inspection target; an irradiator configured to irradiate the inspection target in an excited state in which the elastic wave vibration is excited by the exciter with laser light; and a measurer configured to change a phase of the laser light reflected by the inspection target to cause the laser light having an unchanged phase to interfere with the laser light having a changed phase, and to measure interference light, wherein the measurer is configured to acquire, based on interference light of the laser light with which the inspection target is irradiated by the irradiator and that passes through a first light path in which the reflected laser light travels from the inspection target toward the measurer, an interference image representing a vibration state of the inspection target as viewed in a direction extending along the first light path, and to acquire, based on interference light of the laser light with which the inspection target is irradiated by the irradiator and that passes through a second light path in which the reflected laser light travels from the inspection target in a direction different from the first light path, an interference image representing a vibration state of the inspection target as viewed in a direction extending along the second light path.

Mode Item 2

The defect inspection apparatus according to mode item 1 further including an optical system that is configured to guide the laser light that passes through the second light path in which the reflected laser light travels in a direction different from the first light path toward the measurer, wherein the measurer is configured to acquire, based on interference light of the laser light that passes through the first light path in which the reflected laser light travels from the inspection target directly toward the measurer without passing through the optical system, an interference image representing a vibration state of the inspection target as viewed in a direction extending along the first light path, and to acquire, based on interference light of the laser light that passes through the second light path in which the reflected laser light is guided toward the measurer by the optical system, an interference image representing a vibration state of the inspection target as viewed in a direction extending along the second light path.

Mode Item 3

The defect inspection apparatus according to mode item 2, wherein the measurer: includes a common image capturer configured to capture images of interference light of the laser light that passes through the first light path in which the reflected laser light travels from the inspection target toward the measurer, and interference light of the laser light that passes through the second light path in which the reflected laser light travels from the inspection target in the direction different from the first light path and is guided toward the measurer by the optical system.

Mode Item 4

The defect inspection apparatus according to any of mode items 1 to 3, wherein the measurer is configured to acquire, based on interference light of the laser light that passes through the first light path in which the reflected laser light travels from the inspection target in a direction orthogonal to a surface of the inspection target in a frontward direction toward the measurer, an interference image representing a vibration state of the inspection target as viewed in the frontward direction, and to acquire, based on interference light of the laser light that passes through the second light path in which the reflected laser light travel in a direction inclined with respect to the surface of the inspection target, an interference image representing a vibration state of the inspection target as viewed in the inclined direction.

Mode Item 5

The defect inspection apparatus according to mode item 3, wherein the measurer is configured to acquire, based on interference light of the laser light that passes through the first light path in which the reflected laser light travels from the inspection target in a direction orthogonal to a surface of the inspection target in a frontward direction toward the measurer without passing through the optical system, a first interference image representing a vibration state as viewed in the frontward direction, and to acquire, based on interference light of the laser light that is guided toward the measurer by the optical system to pass through the second light path in which the reflected laser light travels in a direction inclined with respect to a common surface common to the surface of the inspection target by which the laser light is reflected toward the first light path leading to the measurer dissimilar to the first light path, a second interference image representing a vibration state as viewed in the inclined direction.

Mode Item 6

The defect inspection apparatus according to mode item 5, wherein the image capturer includes a light-receiving area for receiving interference light of the laser light that results f interference by the measurer; the optical system is arranged at a position other than the first light path, and is configured to guide the laser light that passes through the second light path toward the measurer; and the measurer is configured to receive interference light of the laser light that passes through the first light path in which the reflected laser light travels from the common surface of the inspection target and interference light of the laser light that passes through the second light path in which the reflected laser light travels from the common surface of the inspection target in a plurality of areas of the light-receiving area that are defined by dividing the light-receiving area into the plurality of areas corresponding to the interference light of the laser light that passes through the first light path and the interference light of the laser light that passes through the second light path whereby simultaneously acquiring the first interference image and the second interference image.

Mode Item 7

The defect inspection apparatus according to mode item 5, wherein the image capturer includes a light-receiving area for receiving interference light of the laser light that results from interference by the measurer; and the measurer is configured to switch interference light of the laser light to be received in a common area of the light-receiving area of the image capturer between interference light of the laser light that passes through the first light path in which the reflected laser light travels from the common surface of the inspection target and interference light of the laser light that passes through the second light path in which the reflected laser light travels from the common surface of the inspection target whereby acquiring the first interference image and the second interference image.

Mode Item 8

The defect inspection apparatus according to any of mode items 5 to 7 further including an image processor configured to acquire a composite image by combining the first interference image representing a vibration state as viewed in the frontward direction orthogonal to the surface of the inspection target toward the measurer and the second interference image representing a vibration state as viewed in the direction inclined with respect to the surface of the inspection target in a measurement area of the inspection target.

Mode Item 9

The defect inspection apparatus according to mode item 8, wherein the image processor is configured to correct distortion of at least the second interference image in the first interference image representing a vibration state as viewed in the frontward direction orthogonal to the surface of the inspection target toward the measurer and the second interference image representing a vibration state as viewed in the direction inclined with respect to the surface of the inspection target in a measurement area of the inspection target.

Mode Item 10

The defect inspection apparatus according to mode item 3, wherein the inspection target has a curved surface; the image capturer includes a light-receiving area for receiving interference light of the laser light that results from interference by the measurer; the optical system is arranged at a position other than the first light path, and is configured to guide toward the measurer the laser light that is reflected by a measurement area of the inspection target, which has the curved surface, different from a measurement area of the inspection target by which the laser light is reflected toward the first light path leading to the measurer, and passes through the second light path; and the measurer is configured to receive interference light of the laser light that passes through the first light path from one of the different measurement areas and interference light of the laser light that passes through the second light path from another of the different measurement areas in a plurality of areas of the light-receiving area of the image capturer that are defined by dividing the light-receiving area into the plurality of areas corresponding to the interference light of the laser light that passes through the first light path and the interference light of the laser light that passes through the second light path whereby simultaneously acquiring interference images representing vibration states of the different measurement areas of the inspection target, which has the curved surface.

Mode Item 11

The defect inspection apparatus according to mode item 3, wherein the inspection target has a curved surface; the image capturer includes a light-receiving area for receiving interference light of the laser light that results from interference by the measurer; the optical system is configured to guide toward the measurer the laser light that is reflected by a measurement area of the inspection target, which has the curved surface, different from a measurement area of the inspection target by which the laser light is reflected toward the measurer to pass through the first light path, and passes through the second light path; and the measurer is configured to switch interference light of the laser light to be received in a common area of the light-receiving area of the image capturer between interference light of the laser light that passes through the first light path from one of the different measurement areas of the inspection target, which has the curved surface, and interference light of the laser light that passes through the second light path from another of the different measurement areas whereby acquiring interference images representing vibration states of the different measurement areas of the inspection target, which has the curved surface.

Mode Item 12

The defect inspection apparatus according to mode item 10 or 11 further including an image processor configured to correct a length of the inspection target at least in a direction extending along the curved surface in the acquired interference image representing a vibration state of the inspection target based on a curvature of the curved surface of the inspection target.

Mode Item 13

The defect inspection apparatus according to mode item 12, wherein the measurer is configured to acquire interference images representing vibration states in a plurality of measurement areas of the inspection target; and the image processor is configured to continuously couple the interference images, which are acquired in the plurality of measurement areas to represent the vibration states, in a direction extending along the curved surface of the inspection target.

Mode Item 14

A defect inspection method including imparting elastic wave vibration to an inspection target to excite the elastic wave vibration in the inspection target; irradiating the inspection target in an excited state in which the elastic wave vibration is excited with laser light; and acquiring, based on interference light of the laser light with which the inspection target is irradiated and that passes through a first light path in which the reflected laser light travels toward a measurer configured to change a phase of the laser light reflected by the inspection target to cause the laser light having an unchanged phase to interfere with the laser light having a changed phase and to measure the interference light, an interference image representing a vibration state of the inspection target as viewed in a direction extending along the first light path, and acquiring, based on interference light of the laser light that passes through a second light path in which the reflected laser light travels from the inspection target in a direction different from the first light path, an interference image representing a vibration state of the inspection target as viewed in a direction extending along the second light path.

DESCRIPTION OF REFERENCE NUMERALS

1: vibrator (exciter)
2: laser illuminators (irradiator)
3: measurers
4, 204, 304, 504: optical system
5: controller (image processor)
8, 308: inspection target
21, 221, 321, 421, 521: first light path
22, 222, 322, 422, 522: second light path
30, 230, 330, 430, 530: light-receiving area
30a, 30b, 330a, 330b, 430a, 430b, 430c, 430d: area
36, 236, 336, 436, 536: image sensor (image capturer)
70, 370, 470: interference image
71, 271: first interference image
72, 272: second interference image
73, 273: composite image
80: surface (of inspection target)
100, 200, 300, 400, 500, 600: defect inspection apparatuses
380: curved surface (of inspection target)
371, 372, 471, 472, 473, 474, 571, 572: interference image

The invention claimed is:

1. A defect inspection apparatus comprising:

an exciter configured to impart elastic wave vibration to an inspection target to excite the elastic wave vibration in the inspection target;

an irradiator configured to irradiate the inspection target in an excited state in which the elastic wave vibration is excited by the exciter with laser light; and a measurer configured to change a phase of the laser light reflected by the inspection target to cause the laser light having an unchanged phase to interfere with the laser light having a changed phase, and to measure interference light, wherein the measurer is configured to acquire, based on interference light of the laser light with which the inspection target is irradiated by the irradiator and that passes through a first light path in which the reflected laser light travels from the inspection target toward the measurer, an interference image representing a vibration state of the inspection target as viewed in a direction extending along the first light path, and to acquire, based on interference light of the laser light with which the inspection target is irradiated by the irradiator and that passes through a second light path in which the reflected laser light travels from the inspection target in a direction different from the first light path, an interference image representing a vibration state of the inspection target as viewed in a direction extending along the second light path.

2. The defect inspection apparatus according to claim 1 further comprising an optical system that is configured to guide the laser light that passes through the second light path in which the reflected laser light travels in a direction different from the first light path toward the measurer, wherein the measurer is configured to acquire, based on interference light of the laser light that passes through the first light path in which the reflected laser light travels from the inspection target directly toward the measurer without passing through the optical system, an interference image representing a vibration state of the inspection target as viewed in a direction extending along the first light path, and to acquire, based on interference light of the laser light that passes through the second light path in which the reflected laser light is guided toward the measurer by the optical system, an interference image representing a vibration state of the inspection target as viewed in a direction extending along the second light path.

3. The defect inspection apparatus according to claim 2, wherein the measurer includes a common image capturer configured to capture images of interference light of the laser light that passes through the first light path in which the reflected laser light travels from the inspection target toward the measurer, and interference light of the laser light that passes through the second light path in which the reflected laser light travels from the inspection target in the direction different from the first light path and is guided toward the measurer by the optical system.

4. The defect inspection apparatus according to claim 1, wherein the measurer is configured to acquire, based on interference light of the laser light that passes through the first light path in which the reflected laser light travels from the inspection target in a direction orthogonal to a surface of the inspection target in a frontward direction toward the measurer, an interference image representing a vibration state of the inspection target as viewed in the frontward direction, and to acquire, based on interference light of the laser light that passes through the second light path in which the reflected laser light travel in a direction inclined with respect to the surface of the inspection target, an interference image representing a vibration state of the inspection target as viewed in the inclined direction.

5. The defect inspection apparatus according to claim 3, wherein the measurer is configured to acquire, based on interference light of the laser light that passes through the first light path in which the reflected laser light travels from the inspection target in a direction orthogonal to a surface of the inspection target in a frontward direction toward the measurer without passing through the optical system, a first interference image representing a vibration state as viewed in the frontward direction, and to acquire, based on interference light of the laser light that is guided toward the measurer by the optical system to pass through the second light path in which the reflected laser light travels in a direction inclined with respect to a common surface common to the surface of the inspection target by which the laser light is reflected toward the first light path leading to the measurer dissimilar to the first light path, a second interference image representing a vibration state as viewed in the inclined direction.

6. The defect inspection apparatus according to claim 5, wherein the image capturer includes a light-receiving area for receiving interference light of the laser light that results from interference by the measurer;

the optical system is arranged at a position other than the first light path, and is configured to guide the laser light that passes through the second light path toward the measurer; and the measurer is configured to receive interference light of the laser light that passes through the first light path in which the reflected laser light travels from the common surface of the inspection target and interference light of the laser light that passes through the second light path in which the reflected laser light travels from the common surface of the inspection target in a plurality of areas of the light-receiving area that are defined by dividing the light-receiving area into the plurality of areas corresponding to the interference light of the laser light that passes through the first light path and the interference light of the laser light that passes through the second light path whereby simultaneously acquiring the first interference image and the second interference image.

7. The defect inspection apparatus according to claim 5, wherein the image capturer includes a light-receiving area for receiving interference light of the laser light that results from interference by the measurer; and the measurer is configured to switch interference light of the laser light to be received in a common area of the light-receiving area of the image capturer between interference light of the laser light that passes through the first light path in which the reflected laser light travels from the common surface of the inspection target and interference light of the laser light that passes through the second light path in which the reflected laser light travels from the common surface of the inspection target whereby acquiring the first interference image and the second interference image.

8. The defect inspection apparatus according to claim 5 further comprising an image processor configured to acquire a composite image by combining the first interference image representing a vibration state as viewed in the frontward direction orthogonal to the surface of the inspection target toward the measurer and the second interference image representing a vibration state as viewed in the direction inclined with respect to the surface of the inspection target in a measurement area of the inspection target.

9. The defect inspection apparatus according to claim 8, wherein the image processor is configured to correct distortion of at least the second interference image in the first interference image representing a vibration state as viewed in the frontward direction orthogonal to the surface of the inspection target toward the measurer and the second interference image representing a vibration state as viewed in the direction inclined with respect to the surface of the inspection target in a measurement area of the inspection target.

10. The defect inspection apparatus according to claim 3, wherein the inspection target has a curved surface;

the image capturer includes a light-receiving area for receiving interference light of the laser light that results from interference by the measurer;

the optical system is arranged at a position other than the first light path, and is configured to guide toward the measurer the laser light that is reflected by a measurement area of the inspection target, which has the curved surface, different from a measurement area of the inspection target by which the laser light is reflected toward the first light path leading to the measurer, and passes through the second light path; and the measurer is configured to receive interference light of the laser light that passes through the first light path from one of the different measurement areas and interference light of the laser light that passes through the second light path from another of the different measurement areas in a plurality of areas of the light-receiving area of the image capturer that are defined by dividing the light-receiving area into the plurality of areas corresponding to the interference light of the laser light that passes through the first light path and the interference light of the laser light that passes through the second light path whereby simultaneously acquiring interference images representing vibration states of the different measurement areas of the inspection target, which has the curved surface.

11. The defect inspection apparatus according to claim 3, wherein the inspection target has a curved surface;

the image capturer includes a light-receiving area for receiving interference light of the laser light that results from interference by the measurer;

the optical system is configured to guide toward the measurer the laser light that is reflected by a measurement area of the inspection target, which has the curved surface, different from a measurement area of the inspection target by which the laser light is reflected toward the measurer to pass through the first light path, and passes through the second light path; and the measurer is configured to switch interference light of the laser light to be received in a common area of the light-receiving area of the image capturer between interference light of the laser light that passes through the first light path from one of the different measurement areas of the inspection target, which has the curved surface, and interference light of the laser light that passes through the second light path from another of the different measurement areas whereby acquiring interference images representing vibration states of the different measurement areas of the inspection target, which has the curved surface.

12. The defect inspection apparatus according to claim 10 further comprising an image processor configured to correct a length of the inspection target at least in a direction extending along the curved surface in the acquired interference image representing a vibration state of the inspection target based on a curvature of the curved surface of the inspection target.

13. The defect inspection apparatus according to claim 12, wherein the measurer is configured to acquire interference images representing vibration states in a plurality of measurement areas of the inspection target; and the image processor is configured to continuously couple the interference images, which are acquired in the plurality of measurement areas to represent the vibration states, in a direction extending along the curved surface of the inspection target.

14. A defect inspection method comprising:

imparting elastic wave vibration to an inspection target to excite the elastic wave vibration in the inspection target;

irradiating the inspection target in an excited state in which the elastic wave vibration is excited with laser light; and acquiring, based on interference light of the laser light with which the inspection target is irradiated and that passes through a first light path in which the reflected laser light travels toward a measurer configured to change a phase of the laser light reflected by the inspection target to cause the laser light having an unchanged phase to interfere with the laser light having a changed phase and to measure the interference light, an interference image representing a vibration state of the inspection target as viewed in a direction extending along the first light path, and acquiring, based on interference light of the laser light that passes through a second light path in which the reflected laser light travels from the inspection target in a direction different from the first light path, an interference image representing a vibration state of the inspection target as viewed in a direction extending along the second light path.

* * * * *